US006381373B1

United States Patent
Suzuki et al.

(10) Patent No.: US 6,381,373 B1
(45) Date of Patent: Apr. 30, 2002

(54) APPARATUS AND METHOD FOR REDUCING QUANTIZATION ERROR IN DIGITAL IMAGE SIGNALS

(75) Inventors: Teruhiko Suzuki, Chiba; Yoichi Yagasaki, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/386,822

(22) Filed: Aug. 31, 1999

Related U.S. Application Data

(60) Continuation of application No. 09/130,600, filed on Aug. 7, 1998, now abandoned, which is a division of application No. 08/606,732, filed on Feb. 27, 1996, now Pat. No. 5,907,370.

(30) Foreign Application Priority Data

Feb. 28, 1995 (JP) .......................................... 07-041110

(51) Int. Cl.[7] ................................................. G06K 9/40
(52) U.S. Cl. ................... 382/263; 375/240.29; 382/264
(58) Field of Search ................................. 382/232, 199, 382/251, 254, 260–264, 266, 268, 275; 345/136–138, 611, 615; 358/433, 463; 348/405.1, 419.1, 425.1, 27, 533, 597, 606–607, 613, 618, 621–623, 627, 631, 416.1; 375/240.03, 240.26, 240.29

(56) References Cited

U.S. PATENT DOCUMENTS

| | | | | |
|---|---|---|---|---|
| 5,111,285 A | * | 5/1992 | Fujita et al. | 382/254 |
| 5,339,365 A | * | 8/1994 | Kawai et al. | 382/264 |
| 5,469,208 A | * | 11/1995 | Dea | 348/27 |
| 5,651,078 A | * | 7/1997 | Chan | 382/261 |
| 5,724,098 A | * | 3/1998 | Murakami et al. | 348/416.1 |
| 5,802,218 A | * | 9/1998 | Brailean | 382/261 |

\* cited by examiner

*Primary Examiner*—Timothy M. Johnson
(74) *Attorney, Agent, or Firm*—Frommer Lawrence & Haug LLP; William S. Frommer; Bruno Polito

(57) ABSTRACT

A system for processing digital image signals to reduce the effect of quantizing noise in the images represented by the signals. An n-bit image signal is converted into an m-bit image signal (m>n). The high frequency content of the m-bit signal is estimated and then first and second multipliers are derived on the basis of the high frequency content. The first multiplier is applied to the m-bit image signal, the second multiplier is applied to a filtered version of the m-bit image signal, and the two resulting signals are combined to generate a reduced quantizing noise m-bit image signal.

6 Claims, 20 Drawing Sheets

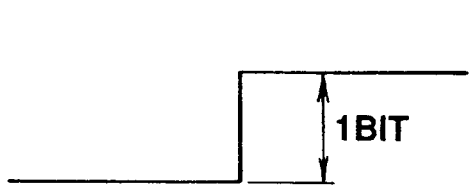 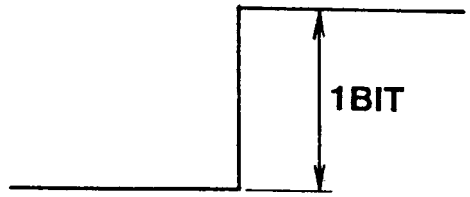
FIG.5A  FIG.5B
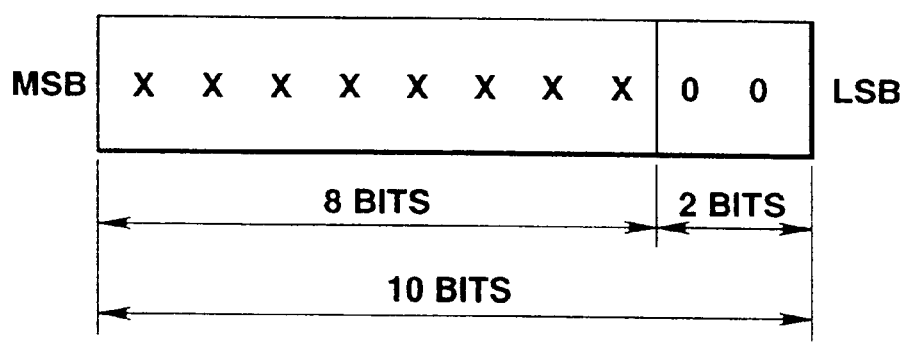
FIG.7

| a | b | c |
|---|---|---|
| d | e | f |
| g | h | i |

3 × 3 INPUT
PIXEL BLOCK

FIG.9A

| 1/16 | 1/8 | 1/16 |
|---|---|---|
| 1/8 | 1/4 | 1/8 |
| 1/16 | 1/8 | 1/16 |

3 × 3 FILTER
COEFFICIENT

FIG.9B

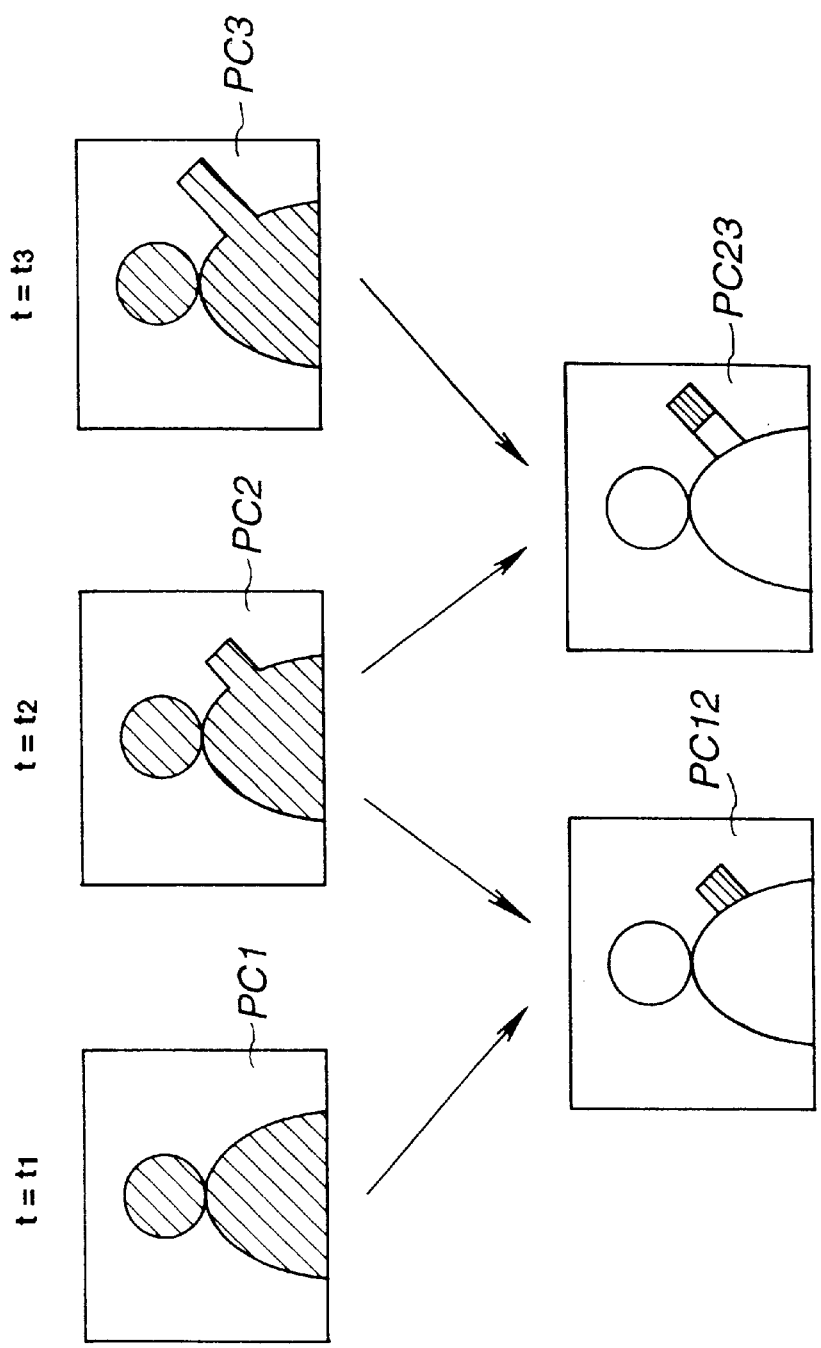

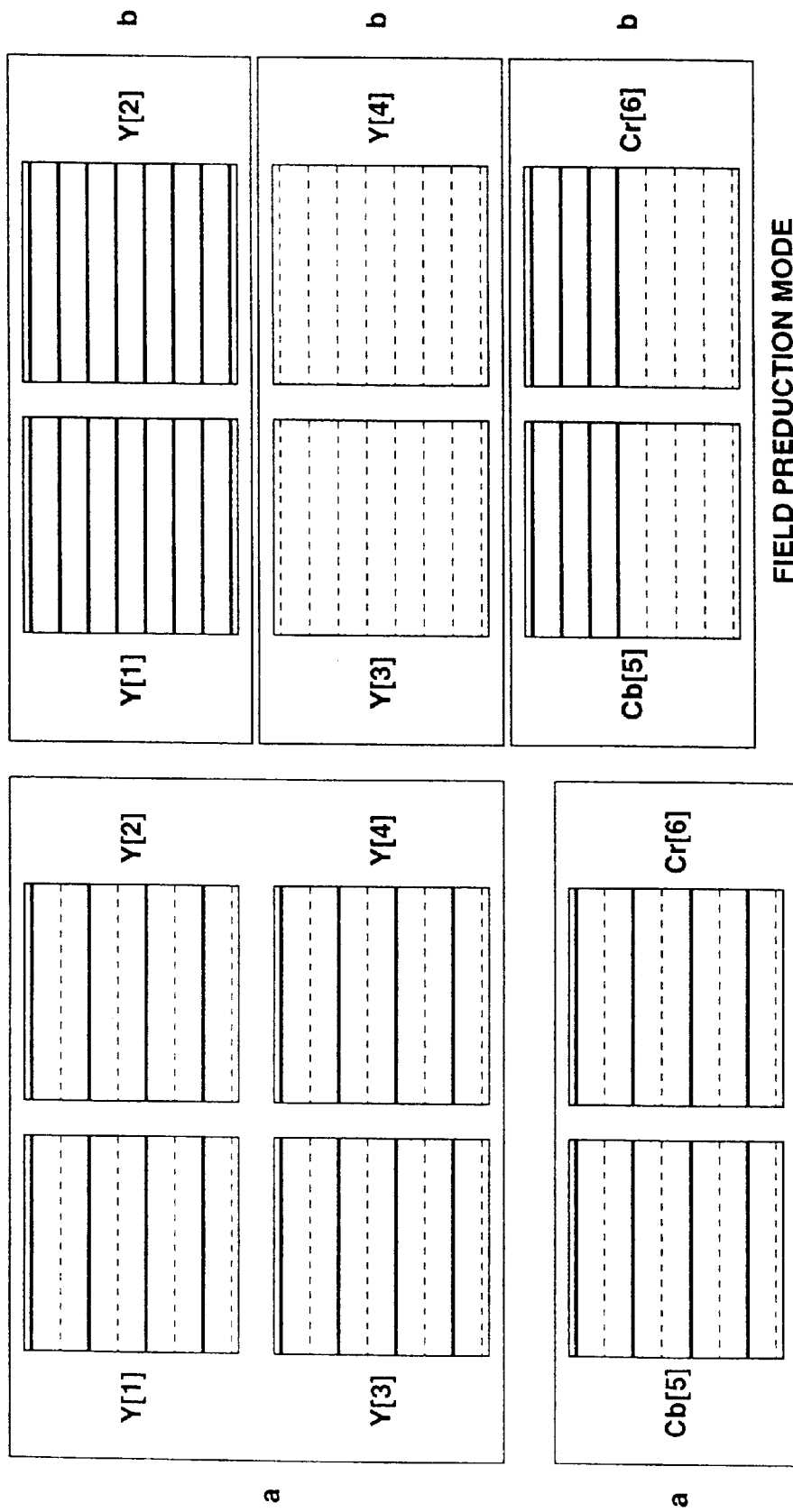
FIG. 18A FRAME PREDUCTION MODE
FIG. 18B FIELD PREDUCTION MODE

FRAME DCT MODE

FIELD DCT MODE

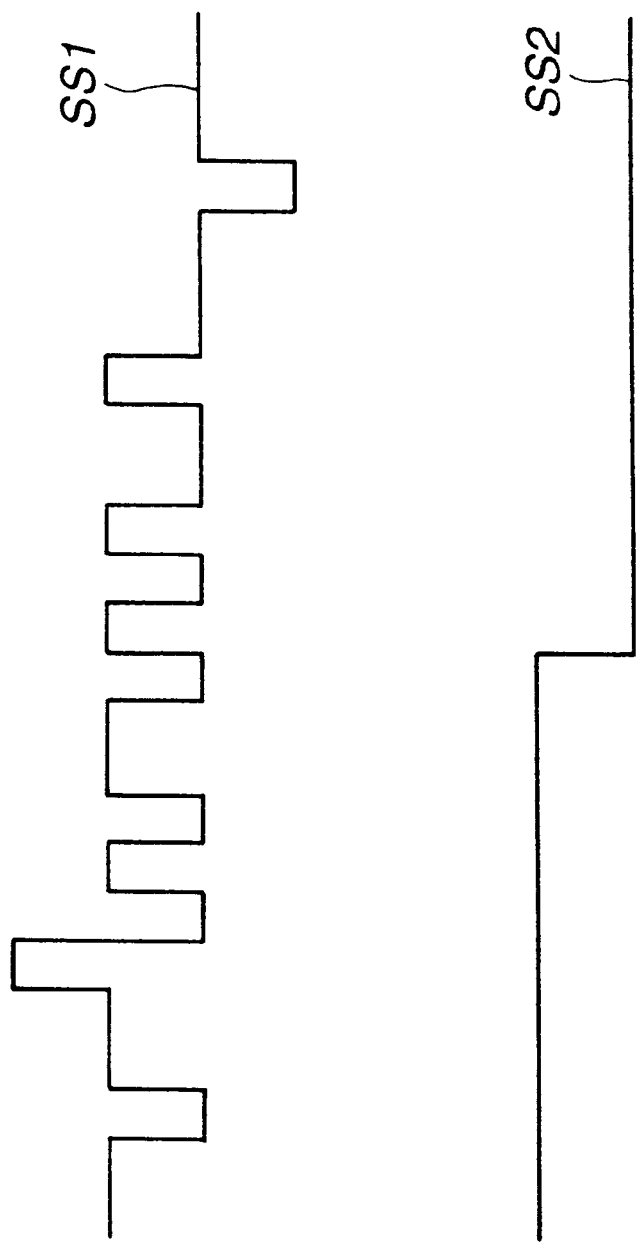

APPARATUS AND METHOD FOR REDUCING QUANTIZATION ERROR IN DIGITAL IMAGE SIGNALS

CROSS-REFERENCE TO RELATED APPLICATION

This application is a continuation of application Ser. No. 09/130,600, filed Aug. 7, 1998, abandoned, which is a division of application Ser. No. 08/606,732, filed Feb. 27, 1996, now U.S. Pat. No. 5,907,370.

BACKGROUND OF THE INVENTION

1. Field of the Invention

The present invention generally relates to an image signal processing apparatus, an image signal processing method, and an image signal decoding apparatus. More specifically, the present invention in directed to an image signal processing apparatus, an image signal decoding apparatus capable of reducing a quantizing error when an encoded image signal is decoded to be displayed.

2. Description of the Related Art

In such a system, a moving picture signal is recorded on a recording medium such as a magneto optical-disk and a magnetic tape, this moving picture signal is reproduced so as to be displayed. An moving picture signal is transmitted from a transmitter via a transmission path to a receiver, as in a TV conference system, a TV telephone system, and a broadcasting appliance. In these systems, since the transmission path and the recording medium are utilized at a high efficiency, the image signals are compressed and coded by utilizing the line correlation as well as the frame correlation of the video signals.

A description will now be made of the high-efficiency coding of the moving picture signal.

Conventionally, moving image data such as video signals contains very large quantities of information. Thus, to record/reproduce this moving image data for a long time duration, the recording mediums whose data transfer speeds are very high are necessarily required. As a result, a large-sized magnetic tape and a large-sized optical disk are needed. When moving image data is transmitted via the transmission path, or broadcasted, since an excessive data amount must be transferred, such moving image data could not be directly transmitted via the presently existing transmission path.

Under such a circumstance, when a video signal is recorded on a compact recording medium for a long time, or is used in a communication and a broadcasting system, the video signal must be processed in the high-efficiency coding for a recording purpose, and further such a means for decoding this read signal at a higher efficiency must be employed. To accept such needs, the high-efficiency coding methods by utilizing the video signal correlation have been proposed. As one of these method, so-called "MPEG (moving picture experts group) 1 and 2" have been proposed. This method has been proposed as a standard method in ISO-IEC/JTC1/SC2/WG11 conference. That is, such a hybrid system combining the movement compensation prediction coding with DCT (discrete cosine transform) coding has been employed.

The movement compensation prediction coding corresponds to the method for using correlation of the image signal along the time base direction. The presently entered image is predicted from the signal already being decoded and reproduced, and only the prediction error is transmitted, so that the information amount required in the data coding is compressed.

The DCT coding is such a coding method that signal power is concentrated to a specific frequency component by utilizing the frame two-dimensional correlation owned by the image signal, and only the concentrated/distributed coefficients are coded. As a result, the information amount can be compressed. For instance, the DCT coefficient at a flat picture portion of which self-correlation is high is concentrated and distributed into the low frequency component. Thus, in this case, only the coefficient concentrated/distributed to the low frequency component is coded, so that the information amount can be reduced.

It should be noted that although the MPEG 2 system is employed as the coding device in the specification, many other coding systems except for the MPEG system may be applied.

In general, to improve an image impression in a TV monitor, a filter for emphasizing the image is employed. There are various sorts of emphasizing process filters. For example, there is such a high-pass filter for emphasizing a high frequency component of an image signal. Also, a so-called "contrast filter" is provided to amplify an amplitude of an image signal. There is another filter for converting density gradation.

These emphasizing filters not only emphasize the image signal to increase the visual impression, but also the noise contained in the signal. As a consequence, when the image signal contains many noises, these noises would become apparent, resulting in deterioration of visual impressions.

The output signal to the display unit of the TV monitor, and thus, the above-explained emphasizing process is performed after the digital signal is converted into the analog signal. This is shown in FIG. 1 and FIG. 2.

FIG. 1 shows such a case that an input to a TV monitor 400 is a digital signal. The digital input signal is D/A-converted into an analog signal by a D/A converter 401, and then is emphasized by an emphasizing filter 402. Thereafter, the emphasized signal is supplied to a display unit 403 for representation.

FIG. 2 shows another case that an input to a TV monitor 410 is an analog signal. The analog input signal is emphasized by an emphasizing filter 412 to be supplied to a display unit 413 for representation.

In the case of the analog image signal, random noises such as white noise are major noises. The noises of the digital signal are block distortion, and quantizing noises near edges. These noises are locally produced and own higher correlation-thereof. When the noise contained in the digital image signal is emphasized, the visual impression would be greatly deteriorated, and would give unnatural impression.

Normally, a digital image signal is quantized by 8 bits. In the normal image signal, quantizing noise could not be visually recognized. In other words, no discrimination can be made of a 1-bit interval in 8 bits. However, as shown in FIG. 3, when an image signal is simply increased in a flat manner, this quantizing error, namely 1-bit interval can be recognized. This is because a human observation is very sensible to this flat portion, and steps of 1-bit interval are continuous.

A similar phenomenon appears as to an image with a better S/N ratio. When an image owns a low S/N ratio, the 1-bit interval is mixed with noises, which cannot be therefore observed. However, as to an image having low noise, the quantizing error (1-bit interval) can be discriminated. This phenomenon especially occurs in the noise-eliminated image, and the signal and CG produced by the image signal generating apparatus.

When the image signal is coded, a similar phenomenon occurs. A general image signal contains noise. When the coding bit rate is high, this noise component is also coded-to be transmitted. When the coding bite rate is low, this noise component could not be transmitted. At this time, in the MPEG coding system to perform the block processing, this may be observed as a block-shaped noise. If such a block-shaped distortion is continued, even when this corresponds to a step of 1-bit difference, it could be visually recognized. Since this is observed as a pseudo contour, it is called as a "pseudo contour".

FIG. 4A and FIG. 4B represent such a case that pseudo contours are produced. FIG. 4A indicates a two-dimensional pattern displayed on a screen. FIG. 4B represents a signal level on a line a to "a" of FIG. 4A.

A similar phenomenon will occur when a decoded image signal is emphasized. When the image signal is emphasized, a 1-bit difference would be widened. This phenomenon will now be explained with reference to FIG. 5A and FIG. 5B.

FIG. 5A shows a case that a step of a 1-bit difference is converted into an analog signal. When this signal is emphasized, as shown in FIG. 5B, the 1-bit difference would be widened. As a result, this 1-bit difference could be visually recognized. This phenomenon is visually recognized as a pseudo contour.

When the image signal is decoded in the above-described manner, the quantizing error can be visually recognized to produce the pseudo contour.

Also, there is another possibility that the quantizing error can be discriminated also in the not-coded image signal. This may be caused by the performance limits by the 8-bit quantizing process.

As described above, when the digitally compressed image is observed on the TV monitor with the emphasizing process, the noise (deterioration) caused by the compression would be emphasized to deteriorate the image impressions. Thus, there is a problem of occurrences of unnatural images.

SUMMARY OF THE INVENTION

The present invention has been made to solve such various problems, and therefore, has an object to provide an image signal processing apparatus, an image signal processing method, and an image signal decoding apparatus, which are capable of suppressing a quantizing noise even in a coded image signal.

Another object of the present invention is to provide such a system that even when a digital image signal is observed by a TV monitor with a function of a signal emphasizing process operation, a naturally good image could be reproduced.

A further object of the present invention is to provide such a system that even in an original image signal which is coded, a quantizing error caused by a limitation in an 8-bit quantizing process could not be apparently observed.

To solve the above-described problems, an image signal processing apparatus, according to the present invention, is featured by comprising:
bit expanding means for bit-expanding an n-bit quantized input image signal into an m-bit (symbols "n" and "m" are integers, and own a relationship of n<m);
control signal output means for outputting a control signal based upon said input image signal; and
a converting unit for adaptively converting the signal from said bit expanding means into an m-bit signal in response to the control signal from said control signal output means.

In the converting unit, the input image signal is smoothed, and at the same time, such a process is performed in order not to lose the high frequency component of the input image signal. For example, a low-pass filter is employed to perform the signal smoothing. To compensate for the high frequency component, the original input image signal is adaptively used, and the n-bit input image signal is converted into an m-bit signal.

This may be similarly applied to such an image signal decoding apparatus capable of decoding such an image signal which has been coded by the prediction image coding method.

In the bit expanding means, (m−n) bits of "0" are added to an LSB (least significant bit) of an n-bit input image signal in order to simply perform the bit expansion from n bits into m bits. In the control signal output means, the converting unit is adaptively controlled in response to the input image signal, so that the high frequency component of the input image signal is not lost. In the bit converting means, the m-bit smoothed signal is outputted within such a range that the high frequency component is not lost in response to the control signal.

BRIEF DESCRIPTION OF THE DRAWINGS

For a better understanding of the present invention, reference is made of a detailed description to be read in conjunction with the accompanying drawings in which:

FIG. 5A and FIG. 5B are diagrams for showing an image signal emphasized processed;

FIG. 7 is a diagram for explaining such an operation to bit-expand 8 bits into 10 bits;

FIG. 9A shows a concrete example of a 3×3 pixel block;

FIG. 9B indicate a concrete example of a two-dimensional low-pass filter (LPF);

FIG. 12A and FIG. 12B are diagrams for explaining the principle idea of the high-efficiency coding;

FIG. 18A and FIG. 18B are diagrams for explaining operation of a prediction mode switching circuit 52 of FIG. 17;

FIGS. 25A and 25B are waveform diagrams representing noise elimination attributed to filter 300.

DETAILED DESCRIPTION OF THE PREFERRED EMBODIMENTS

Referring now to drawings, several preferred embodiments of the present invention will be described.

It should be noted that although the following embodiments will describe such a preferable example when a moving picture is compression-coded by utilizing line correlation and frame correlation, the present invention may be similarly applied to other image signal coding systems. Also, the present invention is not limited to a compressed image signal. Furthermore, although the below-mentioned embodiments will disclose such a case when an 8-bit digital image signal is converted into a 10-bit digital image signal, any bit lengths may be utilized. In general, the present invention may be applied to such a case that n bits are converted into m bits (note that symbols "n" and "m" denote integers, n<m).

Figure 1:
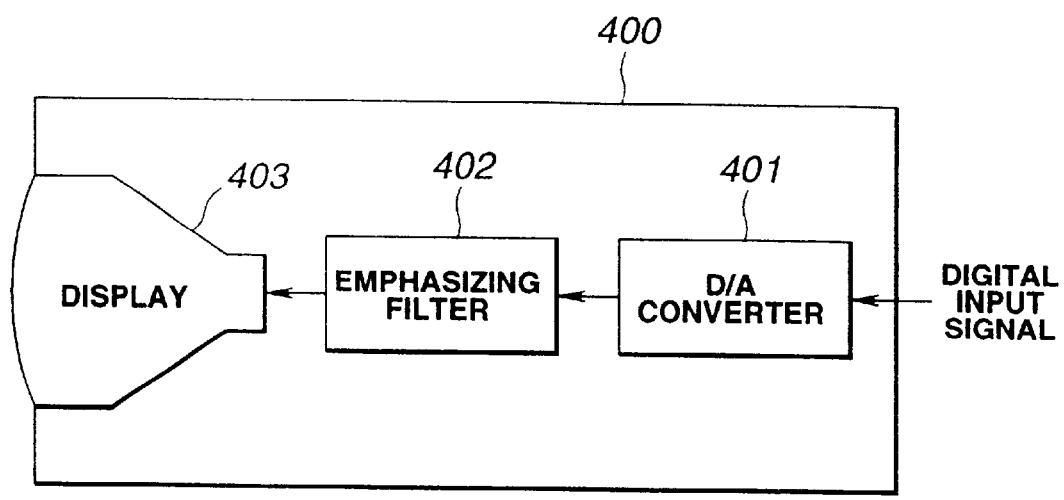
FIG. 1 is a schematic block diagram for representing one example of a digital signal input type monitor apparatus.
Figure 2:
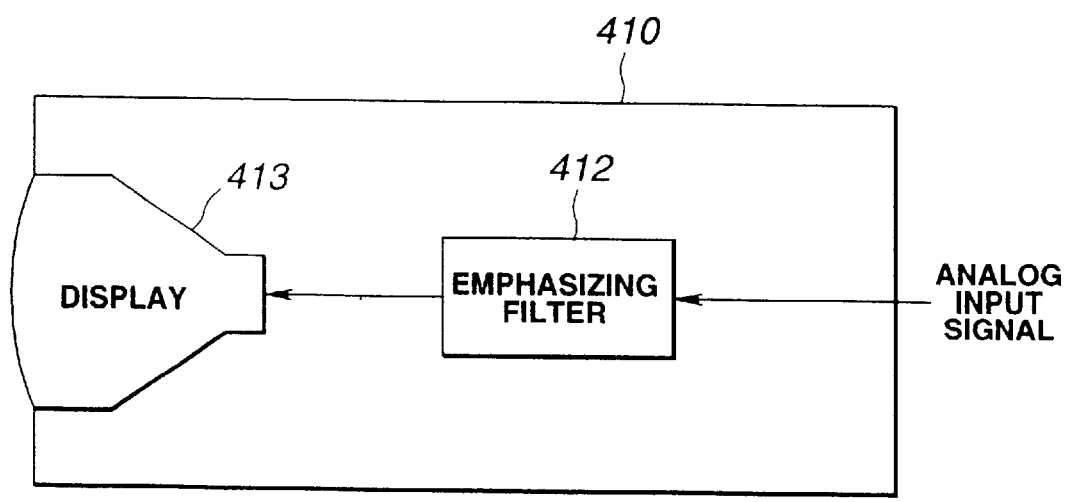
FIG. 2 is a schematic block diagram for representing one example of an analog signal input type monitor apparatus.
Figure 3:
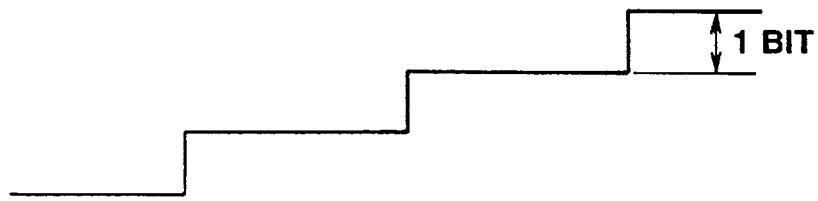
FIG. 3 illustrates an example of such a flat image signal increased monotonously.
Figure 4A:
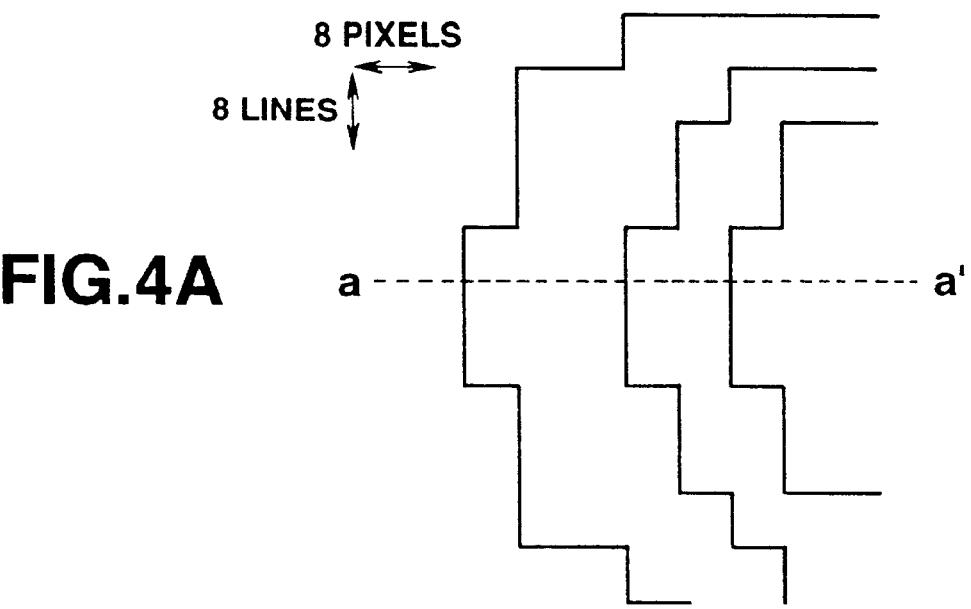
FIG. 4A and FIG. 4B are explanatory diagrams for explanating pseudo contour when a block-shaped distortion is continued.
Figure 4B:
Figure 6:
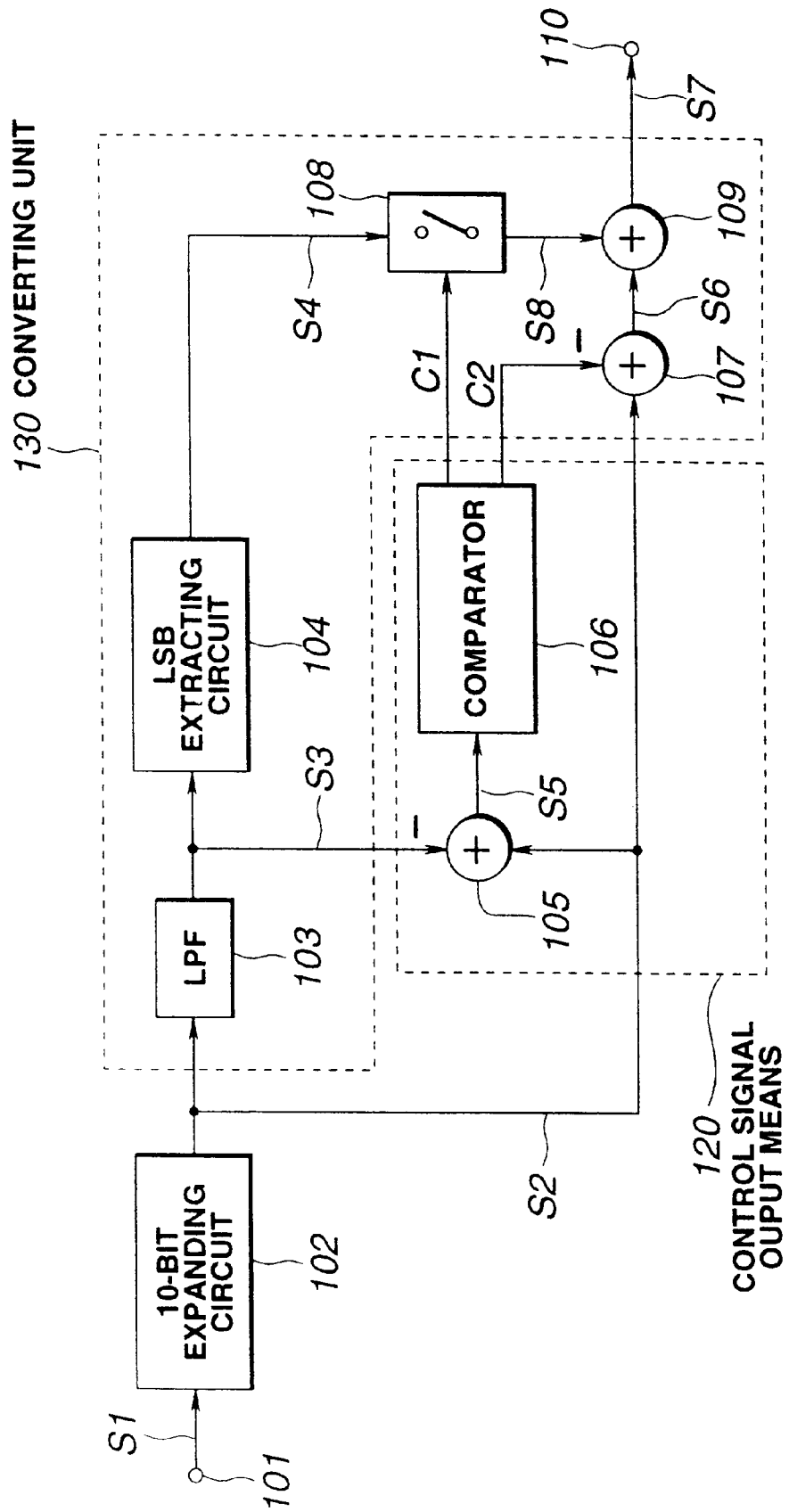
FIG. 6 is a schematic block diagram,for indicating an arrangement of an image signal processing apparatus according to an embodiment of the present invention.

FIG. 6 schematically shows an image signal processing apparatus constituting a first embodiment of the present invention.

In the first embodiment shown in this FIG. 6, an n-bit (for example, 8 bits) image signal S1 is supplied into an input terminal 101. This n-bit (for instance, 8 bits) input image signal is entered into a bit expanding means for bit-expanding the n-bit image signal into an m-bit image signal (m>n), for example a 10-bit expanding circuit 102. In the 10-bit expanding circuit 102, as shown in, e.g., FIG. 7, 2 bits of "0" are added to an LSB (least significant bit) of the entered 8-bit image signal so as to perform the bit expansion, i.e., to output the added signal as a 10-bit image signal S2 In general, (m−n) bits of "0" may be added to a lower sided of an n-bit image signal than an LSB thereof to thereby produce an m-bit image signal.

The output signal S2 of the 10-bit expanding circuit 102 functioning as the bit expanding means is transferred to a control signal output means 120 for outputting a control signal based upon an image character of the input image signal, and a converting unit 130 for properly converting the signal derived from the bit expanding means into an m-bit (for example, 10 bits) signal in response to the control signal derived from this control means 120.

The control signal output means 120 is constructed of an adder 105 and a comparator 106. The converting unit 130 is constructed of a low-pass filter (LPF) 103, an LSB (least significant bit) extracting circuit 104, adders 107 and 109, and a switch 108.

The output signal S2 of the 10-bit expanding circuit 102 functioning as the bit expanding means is sent to the low-pass filter 103 and the adder 107 of the converting unit 130, and to the adder 105 of the control signal output means 120, respectively.

The low-pass filter 103 of the converting unit 130 executes a filtering process to the 10-bit processed image signal S2 to thereby output a signal S3. The output S3 of this low-pass filter 103 is sent to the LSB extractor 104 and the adder 105 of the control signal output means 120.

In the adder 105 of the control signal output means 120, a difference between the output signal S3 of the low-pass filter 103 and the 10-bit processed output signal S2, namely S5=S2−S3 is outputted and then is transferred to the comparator 106. The comparator 106 compares this difference with a predetermined threshold value, e.g., a value "4" corresponding to the 2 bits for addition. As will be discussed later, based upon a comparison result, the comparator 106 outputs a control signal C1 used to add a low order bit without losing the high frequency component of the input image signal, and also another control signal C2 used to control a way to add the low order bit.

The LSB extractor 104 of the control unit 130 extracts only 2 bits from the 10-bits of the image signal on the LSB side as an output signal S4, and then supplied this output signal S4 to the switch 108. The control signal C1 derived from the comparator 106 is supplied as an ON/OFF control signal. The control signal C2 is supplied to the adder 107, and the output signal from the adder 107 is sent to the adder 109 of the converting unit 130. The output signal from the switch 108 is supplied to the adder 109, and the output signal from the adder 109 is derived via an output terminal 110.

Figure 8:
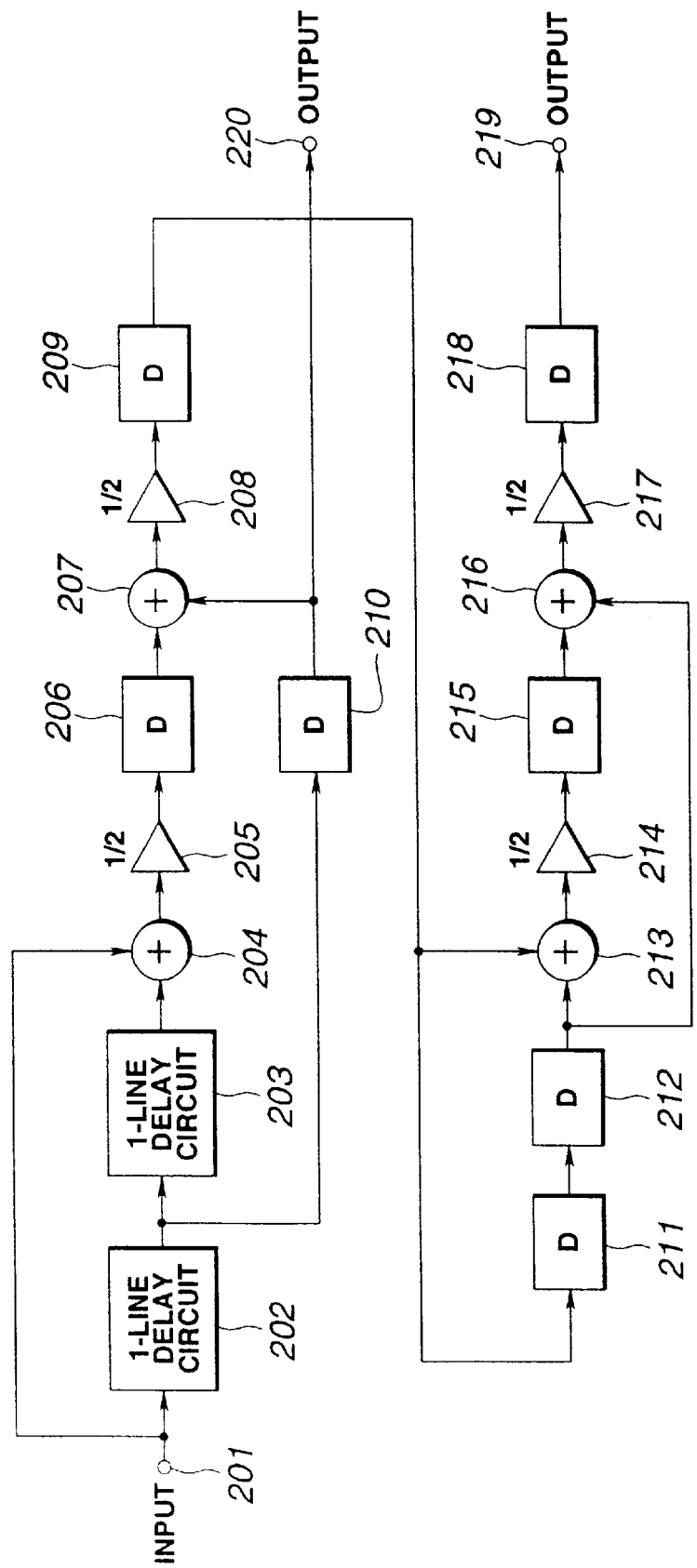
FIG. 8 is a block circuit diagram for showing a concrete example of a tow-dimensional low-pass filter (LPF)

In FIG. 8, there is shown a concrete example of a circuit arrangement of the low-pass filter (LPF) 103 of the above-described converting unit 130.

In the filter arrangement shown in FIG. 8, an input signal supplied to an input terminal 201 is sent to a 1 line delay circuit 202 and an adder 204, and an output signal from the 1 line delay circuit 202 is transferred to a 1 line delay circuit 203 and a 1 pixel delay element 210. An output signal from the 1 line delay circuit is sent to an adder 204 so as to be added with the above-explained input signal, and the added signal is sent via a 1/2 coefficient multiplier 205 to a 1 pixel delay element 206. An output signal from the 1 pixel delay element 206 is supplied to an adder 207, and an output signal from the 1 pixel delay element 210 is sent to the adder 207 and an output terminal 220. An output signal from the adder 207 is supplied via a 1/2 coefficient multiplier 208 to a 1 pixel delay element 209. An output signal from the 1 pixel delay element 209 is sent to a 1 pixel delay element 211 and an adder 213. An output signal from the 1 pixel delay element 211 is sent via a 1 pixel delay element 212 to an adder 213 and another adder 216. An output signal from the adder 213 is supplied via a 1/2 coefficient multiplier 214 and a 1 pixel delay element 215 to an adder 216. An output signal from the adder 216 is derived from an output terminal 219 through a 1/2 coefficient multiplier 217 and a 1 pixel delay element 218.

The filter shown in FIG. 8 is a two-dimensional low-pass filter. FIG. 9A represents a 3×3 pixel block functioning as an input. The two-dimensional low-pass filter extract a 3×3 pixel block around a certain pixel "e" to be processed. With respect to this object, the below-mentioned calculation outputs are recognized as the output values of the filter for the pixel "e": a/16+b/8+c/16+d/8+e/4+f/8+g/16+h/8+i/16. In other words, 3×3 filter coefficients for the respective pixels "a" to "i" are indicated in FIG. 9B. From an output terminal 219 an output value processed in the filter is derived, and an original pixel value of the above-described input signal which is not filtered but has been delayed for a preselected delay time is derived from an output terminal 220.

It should be noted that although FIGS. 9A and 9B describe the FIR filter with 3×3 taps, the number of taps may be arbitrarily selected. Alternatively, an IIR filter may be employed instead of this FIR filter.

Next, operation of the comparator 106 of the control signal output means 120 will now be explained. The comparator 106 first calculates an absolute value of the input signal S5. The comparator 106 judges whether or not the absolute value of the input signal S5 is larger than a threshold value "4". In this case, "4" of a 10-bit signal corresponds to 1 bit of an 8-bit signal. Depending upon the judgement result of the comparator 106, the comparator 106 outputs the control signal C1 to the switch 108 of the converting unit 130, and the control signal C2 to the adder 107.

The switch 108 is controlled in response to the control signal C1. When the absolute value of the input signal S5 is smaller than "4", the switch 108 is turned ON to output the output signal S4 to the adder 109. When the absolute value of the input signal S5 is greater than, or equal to "4", the switch 108 is turned OFF. At this time, "0" is outputted to the adder 109.

The above-described process will now be explained with reference to FIG. 10A and FIG. 10B.

Figure 10A:
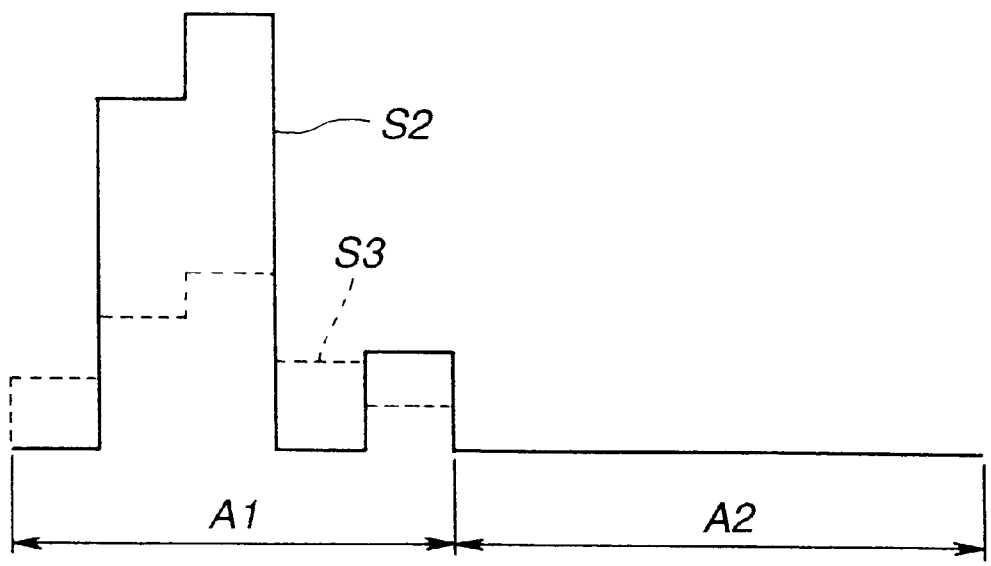
FIG. 10A and FIG. 10B are diagrams for showing a comparison example between an input image signal and a signal outputted from a low-pass filter.
Figure 10B:
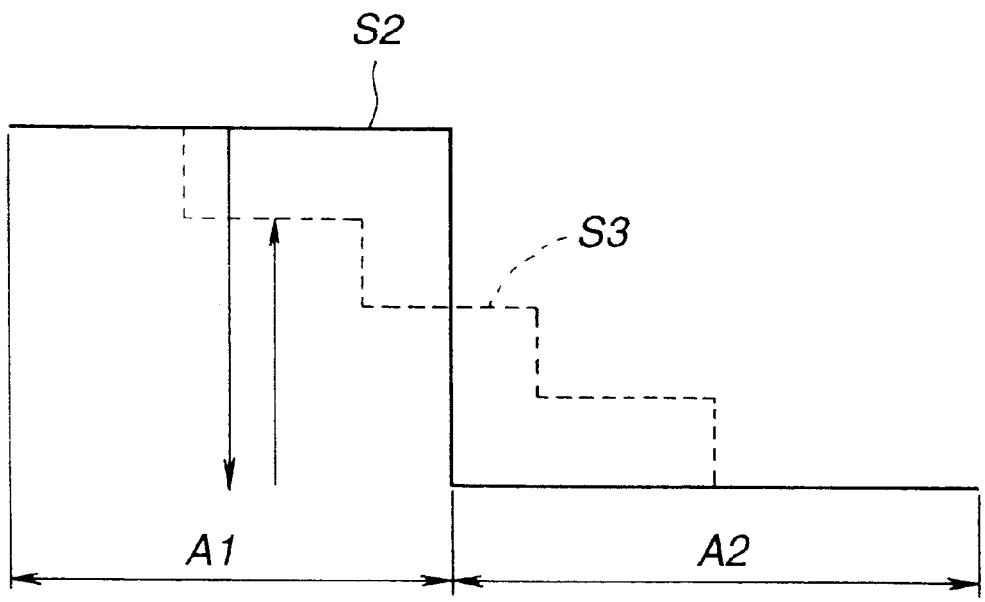

FIG. 10A represents a concrete example for the above-described 8-bit input image signal S1 indicated by a solid line, and the output signal S3 from the low-pass filter 103, as indicated by a dot line. In this embodiment, 2 bits of the signal, on the LSB side thereof, produced from the low-pass filter 103 is added instead of 2 bits of the 10-bit signal S2, on the LSD side thereof, obtained by expanding the input signal S1.

Since the signal S3 is produced by way of the low-pass filter, the high frequency component is lost to produce the blurred image. As a consequence, 8 bits (on MSB side thereof) of the 10-bit image signal of the signal S2 is made coincident with the input image signal S1 in order not to lose the high frequency components as many as possible.

As a result, only when the difference between the respective signals S2 and S3 is smaller than a predetermined threshold value, for example, "4", 2 bits of the signal S3 on the LSB side is added instead of 2 bits of the signal S2 on the LSB side. In other words, in such a flat region where a concentration change is small, the process operation is carried out such that 2 bits of the 10-bit image signal on the LSB side are replaced by 2 bits of the smoothed signal.

In the concrete example of FIG. 10A, a region A corresponds to a region whose concentration change is small, in which since the difference between the respective signals S2 and S3 is smaller than "4", 2 bits of the signal S3 on the LSB side is added to the signal S2. To the contrary, the region A1 corresponds to a region whose concentration change is large, and since the difference is larger than, or equal to 4, the signal S2 is directly outputted.

The adder 107 of FIG. 6 is controlled in response to the control signal C2. When the absolute value of the signal S5 is smaller than 4 and the signal S5 is a positive integer (S2>S3), 4 is subtracted from the input signal S2 in the adder 107. In other cases, no process operation is performed by the adder 107, but the input signal is outputted therefrom. It is assumed that the output signal from this adder 107 is "S6".

The reason why the above-explained process operation is performed will now be explained with reference to FIG. 10B. An "S2" indicated by a solid line shows such a signal S2 which is produced by bit-expanding the 8-bit input signal S1 into the 10-bit input signal. "1 (step)" in the 8-bit signal S1 corresponds to "4 ( steps)" in the 10-bit expanded signal S2 An S3 indicated by a dot line of FIG. 10B is an output result of the low-pass filter 3. This is because 2 bits (on the LSB side) of the signal S3 produced by the low-pass filter 3 is added instead of 2 bits of the signal S2 on the LSB side.

In the region A2, since S2<S3, 2 bits of the signal S3 on the LSB side is directly added to the signal S2 However, since the level of the signal S2 is larger than the signal S3 in the region A1, namely S2>S3, 2 bits of the signal S3 on the LSB side is added after "4" is previously subtracted from the signal S2

Next, the output signal S6 obtained from the adder 107 is supplied to the adder 109. In this adder 109, the output signal S8 from the switch 108 is added to the output from the adder 107 to obtain an added signal S7 (S7=S6+S8). This signal S7 is derived from the output terminal 110.

As previously described, in the signal processing circuit of FIG. 6, when the 8-bit quantized digital image signal is converted into the 10-bit image signal, the smoothing process is performed at the same time. Also, the high frequency component of the image signal when the smoothing process is performed is not lost as many as possible.

That is, in the 10-bit image signal, an interval of 1 bit becomes ¼ of an interval of 1 bit of the 8-bit image signal. As a consequence, a more precise image can be represented, as compared with the 8-bit image signal. Also, the 1-bit interval is not so easible observable.

Figure 11A:
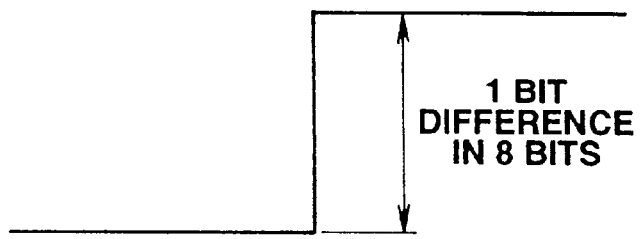
FIG. 11A is an illustration for showing 1 bit of an 8-bit signal.
Figure 11B:
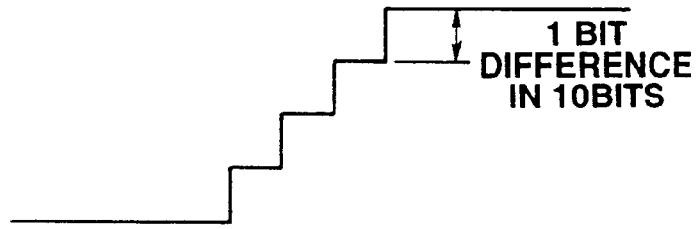
FIG. 11B is an illustration for representing 1 bit of a 10-bit signal.

Thus, as shown in FIG. 11A, when there is a 1-bit concentration (density) change in the 8-bit image signal, in the case that the 8-bit image signal is bit-converted into the 10-bit image signal, the smoothing process is performed thereto at the same time, so that such a smooth signal whose concentration change has been dispersed into 4 pixels, as shown in FIG. 11B. Normally, when such a smoothing process is carried out, the high frequency component of the image signal will be lost. To avoid it, 8 bits (on the MSB side) of the smoothed 10-bit image signal are identical to 8 bits of the input image signal.

As a result, when the conventional method is carried out, namely the 8-bit image signal is processed without any bit conversion, one sort of such a dither method for adding noise to the input image signal has been employed. To the contrary, according to this embodiment, the quantizing noise, pseudo contour is relaxed without adding noise to the input image signal.

In other words, according to the embodiment of the present invention, the 8-bit quantized digital image signal is converted into the 10-bit image signal to produce the half tone (intermediate gradation), so that the quantizing noise produced by the 8-bit quantizing process can be relaxed, or suppressed. In particular, the pseudo contour caused by the performance limit of the 8-bit image signal never appear. In general, this may be realized by applying the present embodiment to such a case that n bits are converted into m bits.

Figures 14A, 14B:
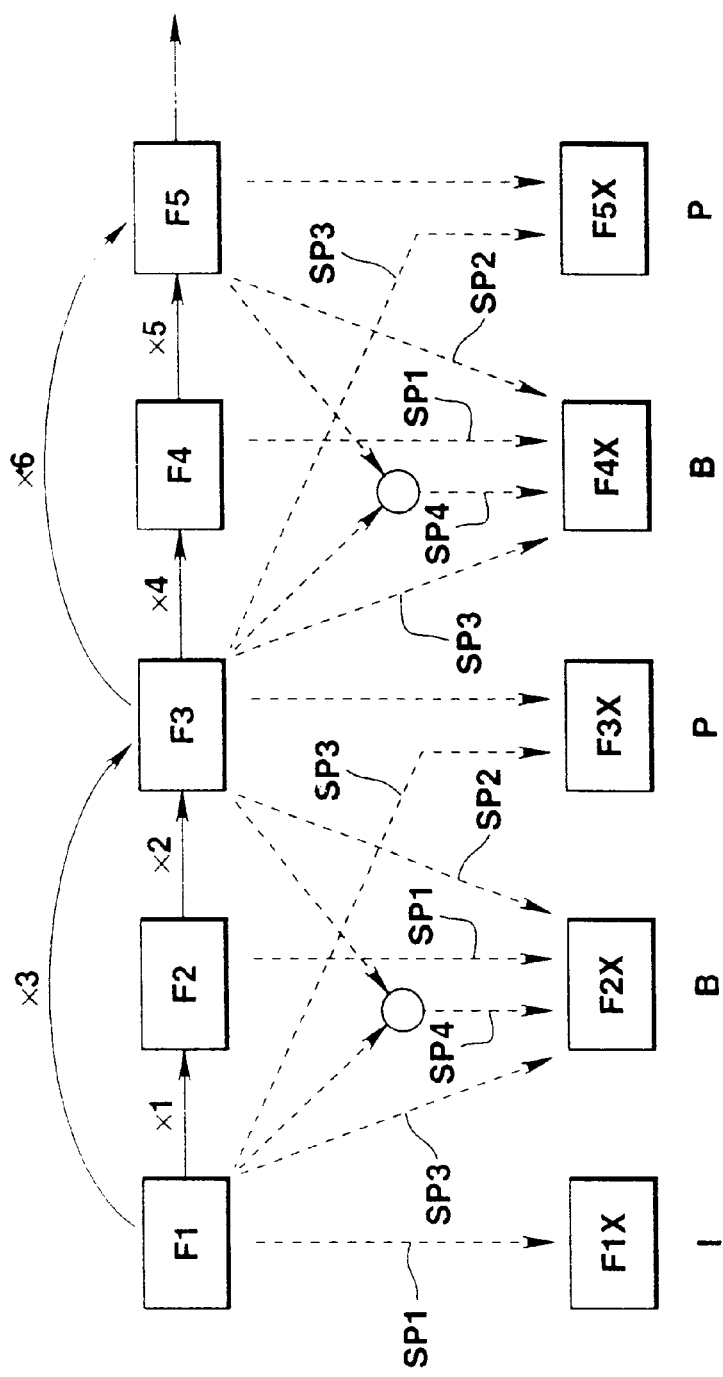
FIG. 14A and FIG. 14B are diagrams for explaining the basic idea to encode a moving picture signal.
Figure 15:
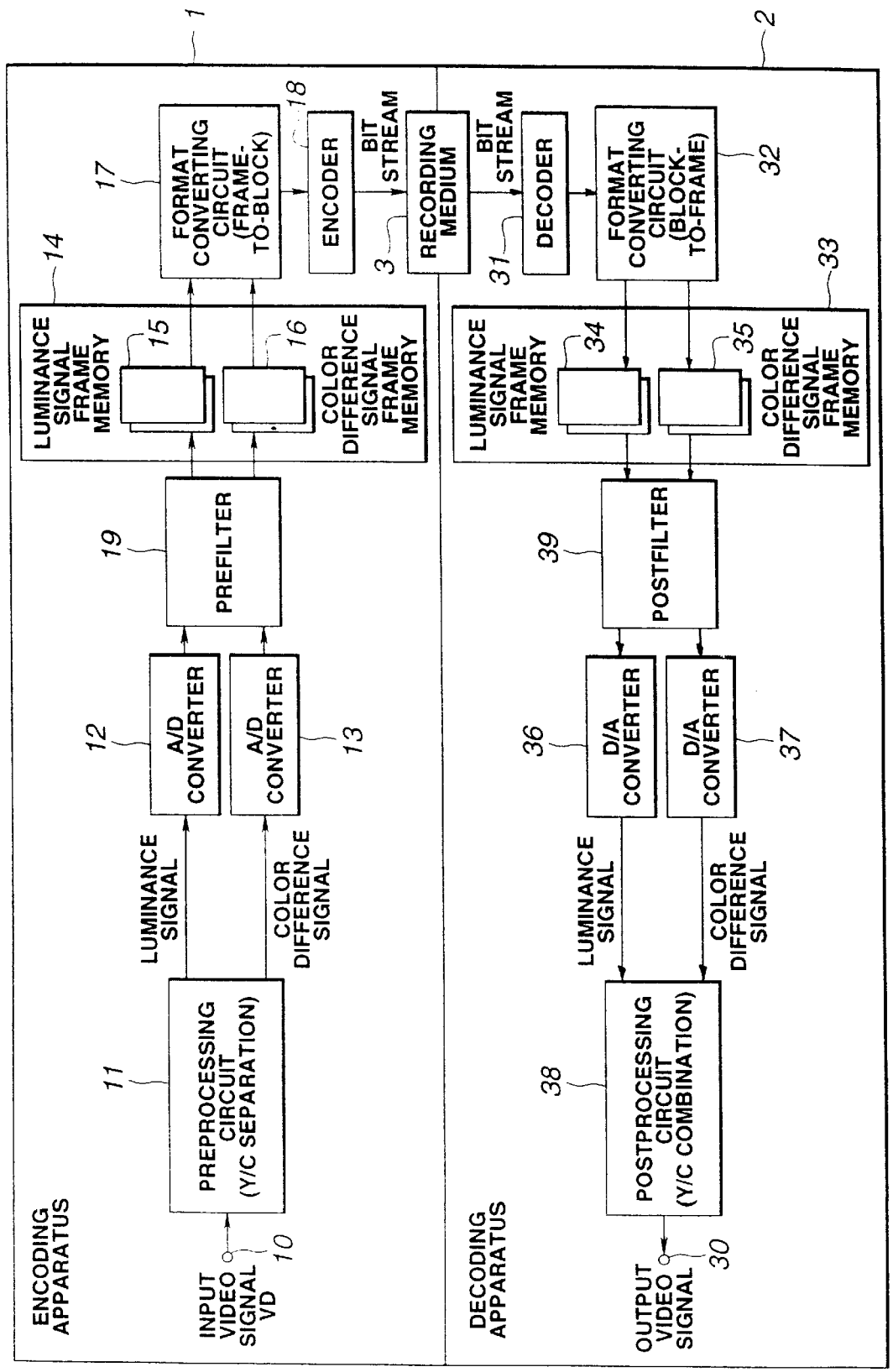
FIG. 15 is a schematic block diagram for indicating a structural example of an image signal encoding apparatus and an image signal decoding apparatus to which the embodiment of the present invention is applied.

The image signal processing apparatus as shown in FIG. 6 may be applied to, for example, a post filter 39 employed in a moving picture coding/decoding apparatus shown in FIG. 15. The moving picture coding/decoding apparatus shown in FIG. 15 employs the high-efficiency coding technique for the moving picture with employment of line correlation and frame correlation. This high-efficiency coding technique will now be explained with reference to FIG. 12 to FIG. 20.

When the line correlation is utilized, an image signal may be compressed by performing, for example, the DCT (discrete cosine transform) process.

When the frame correlation is utilized, the image signal may be further compressed to be coded.

For instance, as shown in FIG. 12A, when frame images PC1, PC2, PC3 are produced at time instants. t=t1, t2, t3, respectively, a difference between image signals of the frame images PC1 and PC2 is calculated to thereby form an image PC12 as indicated in FIG. 12B. Also, another difference between the frame images PC2 and PC3 of FIG. 12A is calculated to produce an image PC23 of FIG. 12B. Normally, since temporally adjoining frame images do not contain a large change, when a difference between the temporally successive frame images is calculated, a difference signal is a small value. That is, as to the image PC12 shown in FIG. 12B, a signal of such a portion indicated by a hatched line in the image PC12 of FIG. 12B is obtained as a difference between the frame image signals of the frame images PC2 and PC3 in FIG. 12A. Then, when this difference signal is coded, the coding amount can be compressed.

However, if only the above-described difference signal is transmitted, then the original image cannot be recovered. Therefore, while the images of the respective frames are set to any one of an I picture (Intra-coded picture), a P picture (Predictive-coded picture), and a B picture (Bidirectionally-predictive-coded picture), the image signal is compressed/coded.

Figure 13A:
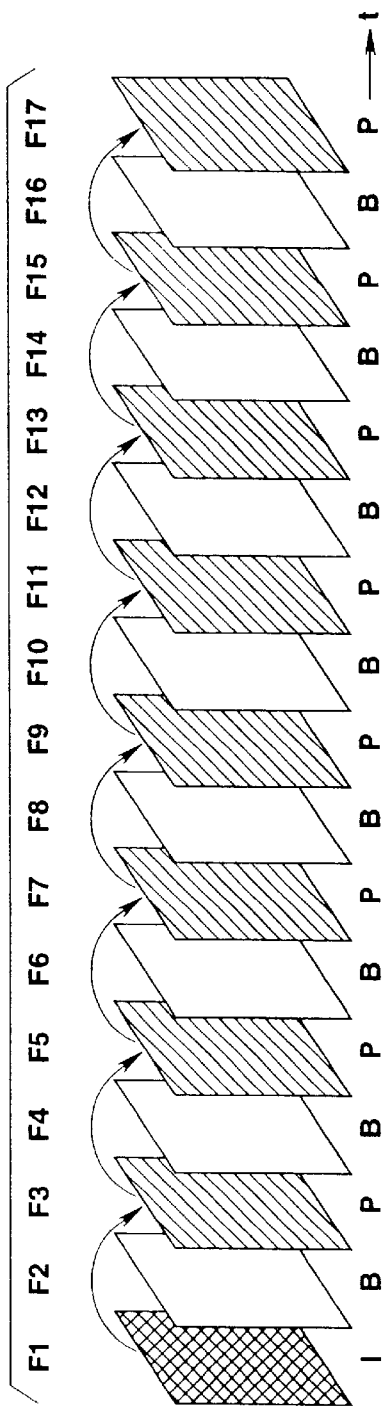
FIG. 13a and FIG. 13B are diagrams for explaining picture types in the case that image data is compressed.
Figure 13B:
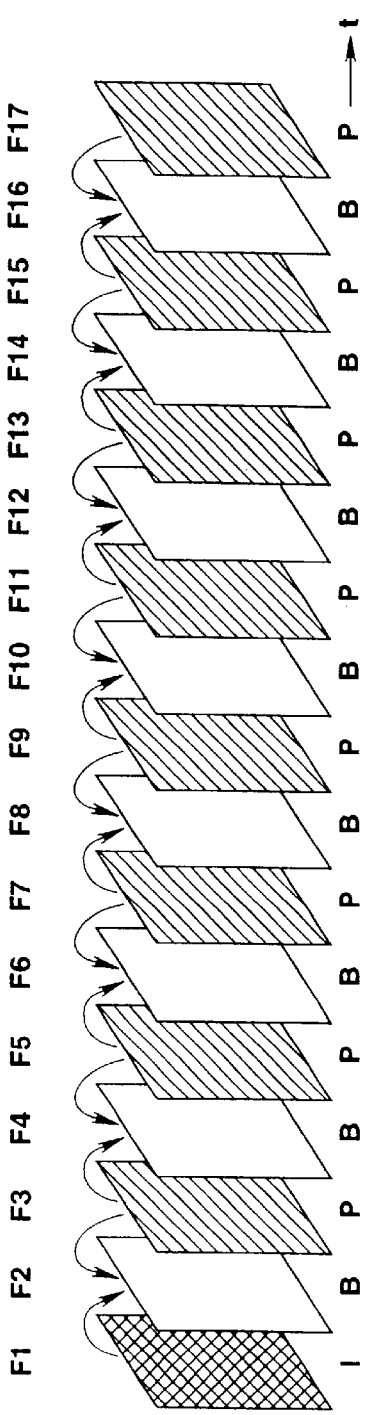

In other words, as represented in FIG. 13A and FIG. 13B, image signals of 17 frames defined from a frame F1 to a frame F17 are handle as a group of picture, namely, one unit of the coding process. Then, the image signal of the head frame F1 is coded as the I picture, the image signal of the second frame F2 is coded as the B picture, and the image signal of the third frame F3 is coded as the P picture. Subsequently, the image signals from the fourth frame F4 until the last frame F17 are alternately processed as either the B pictures or the P pictures.

As the image signal of the I picture, the image signal for 1 frame thereof is directly transmitted without any process. To the contrary, as the image signal of the P picture, basically, as indicated in FIG. 13A, a difference between the image signals of either the I pictures, or the P pictures, which temporally precede this I picture image signal is coded to be transferred. Furthermore, as the image signal of the B picture, basically, as indicated in FIG. 13B, a difference is calculated from average values of the frame images which temporally precede, or succeed this I picture image signal, and then this calculated difference is coded to be transmitted.

FIG. 14A and FIG. 14B schematically represent the principle idea of the method for coding a moving picture (image) signal. In FIG. 14A, frame data of the moving picture signal is schematically shown, whereas in FIG. 14B, frame data to be transmitted is schematically shown. As represented in FIG. 14A and FIG. 14B, since the first frame F1 is processed as the I picture, namely the non-interpolated frame, this first frame F1 is transmitted as transmit data F1X (transmit non-interpolated frame data) (namely, intra-coding process). To the contrary, since the second frame F2 is processed as the B picture, i.e., an interpolated frame, a calculation is carried out about a difference component between the temporally preceding frame F1 and the average value of the temporally succeeding frame F3 (frame coded non-interpolated frame). This difference is transmitted as transmit data (transmit interpolated frame data).

Precise speaking, as this B picture process, there are four sorts of modes switchable in unit of a macroblock. As the first process, the data about the original frame F2 is directly transmitted as transmit data F2X as indicated by an arrow SP1 of a broken line in FIG. 14 (intra-coded mode), which is similar to the process for the I picture. As the second process, a difference between the second frame F2 and the temporally succeeding frame F3 is calculated, and then this difference is transmitted as indicated by an arrow SP2 of a broken line in this drawing (backward prediction mode). As the third process, the difference between the second frame F2 and the temporally preceding frame F1 is transmitted as indicated by an arrow SP3 of a broken line in this drawing (forward prediction mode). Furthermore, as the fourth process, the difference value between the temporally preceding frame F1 and the average value of the temporally succeeding frame F3 is produced, and this difference value is transmitted as transmit data F2X (bidirectional prediction mode).

The method by which the most least data is transmitted among these fourth methods is employed in unit of a macroblock.

It should be noted that when the difference data is transmitted, either a movement vector X1 between the frame images (predicted images) used to calculate the difference value (namely, a movement vector between the frames F1 and F2 in case of the forward prediction mode), or another movement vector X2 (a movement vector between the frames F3 and F2 in case of the backward prediction mode), otherwise both of the movement vectors X1 and X2 (in case of the bidirectional prediction mode) are transmitted together with the difference data.

With respect to the frame F3 of the I picture (frame-coded non-interpolated frame), while using the temporally preceding frame F1 as the prediction image, the difference signal (indicated by an arrow SP3 of a broken line) between this frame F1 and the frame F3 is calculated, and also the movement vector X3 is calculated. This is transmitted as the transmit data F3X (forward prediction mode). Alternatively, the data on the original frame F3 is directly transmitted as the transmit data F3X (indicated as an arrow SP1 of a broken line) (intra-coding mode). In this P picture, the data transmit method is selected in a similar manner to the B picture, namely, the method for transmitting the most least data is selected in unit of a macroblock.

It should be noted that both of the frame F4 in the B picture and the frame F5 in the P picture are processed in a similar manner to the above-described case to thereby obtain transmit data F4X, F5X, and movement vectors X4, X5, X6 etc.

Next, FIG. 15 schematically represents a structural example of an apparatus for coding a moving picture signal to transmit the coded moving picture signal, and also for decoding this coded moving picture signal based upon the above-described principle idea.

In FIG. 15, a coding apparatus 1 codes an inputted video (picture) signal and transmits the coded video signal to a recording medium 3 as a transmission path in order to be recorded thereon. Then, a decoding apparatus 2 reproduces the signal recorded on the recording medium 3 and decodes this reproduced signal to be outputted.

First, in the coding apparatus 1, the video signal VD entered via the input terminal 10 is inputted into a preprocessing circuit 11 by which a luminance signal and a color signal (color difference signal in this case) are separated. The separated luminance signal and color signal are A/D-converted by A/D converters 12 and 13, respectively. The digital video signals A/D-converted in the A/D converters 12 and 13 are supplied to either a front-end filter, or a prefilter 19 so as to be filtered. Thereafter, the filtered digital video signals are supplied to a frame memory 14 so as to be stored therein. In this frame memory 14, the luminance signal is stored in a luminance frame memory 15, and the color difference signal is stored in a color difference signal frame memory 16, respectively.

The above-explained front-end filter, or prefilter 19 performs such a process operation to improve the coding efficiency and the image quality. This refilter 19 correspond to, for example, a noise eliminating filter, or a filter for limiting a bandwidth. As a concrete example of this prefilter, the two-dimensional low-pass filter with the 3×3 pixels may be employed, as explained in connection with FIG. 8 and FIG. 9. In this filter, the uniform filtering process is continuously performed irrelevant to the input image signal, the conditions of the decoders.

Figure 16:
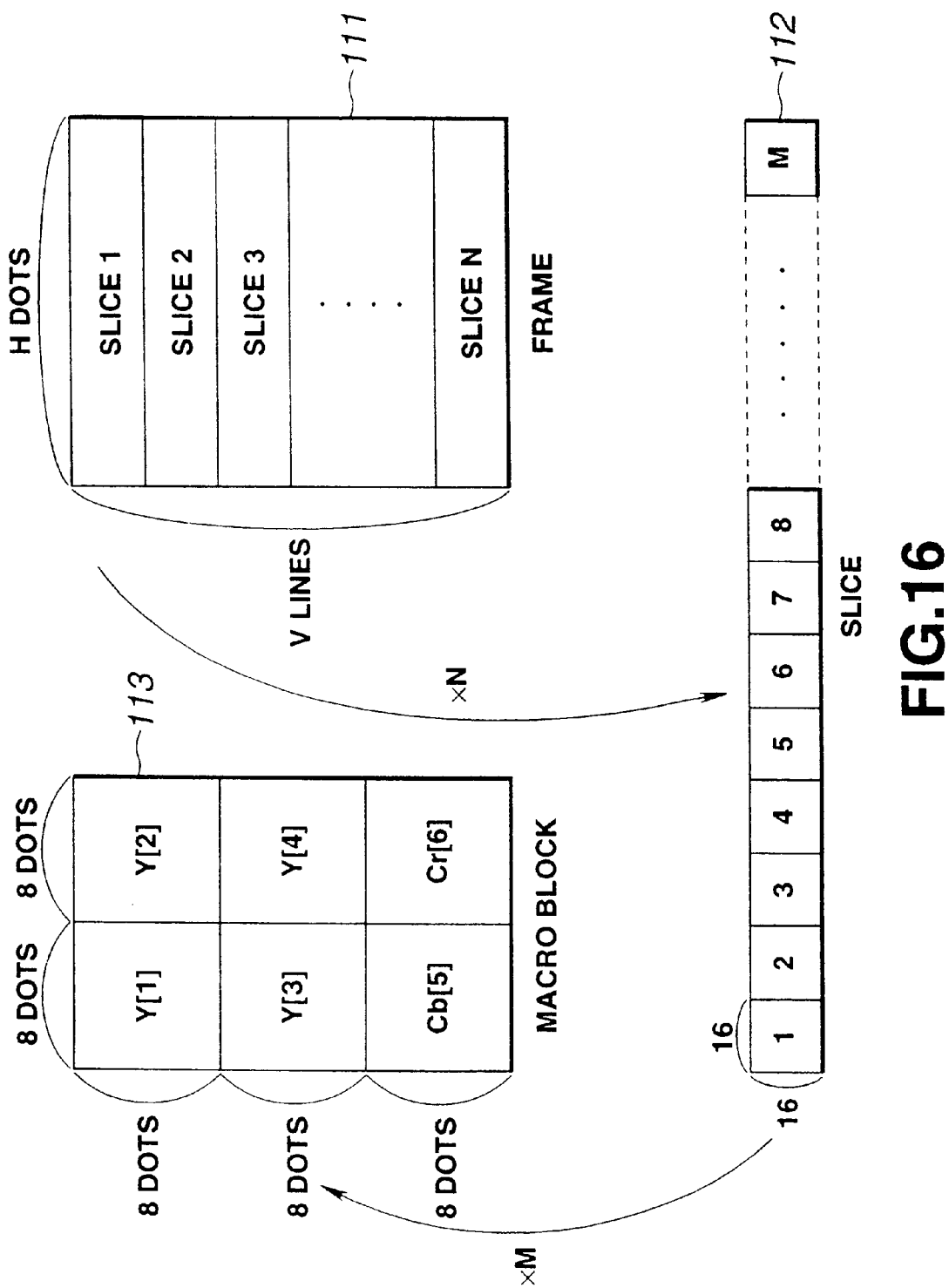
FIG. 16 is an explanatory diagram for explaining a format converting operation of a format converting circuit 17 shown in FIG. 15.

A format converting circuit 17 converts a frame format signal stored in a frame memory 14 into a block format signal. That is, as shown in FIG. 16, the video signal stored in the frame memory 14 is determined as such frame format data 111 that V lines are collected and 1 line contains H dots. The format converting circuit 17 subdivides 1 frame signal into N pieces of slices 112, while using 16 lines as a unit. Then, each slice 112 is subdivided into M pieces of macroblocks. Each macroblock 113 is constructed of a luminance signal corresponding to 16×16 pixels (dots), and this luminance signal is further subdivided into blocks Y[1] to Y[4], and each block is constituted by 8×8-dot Cb signal and a 8×8-dot Cr signal.

As described above, the data converted into the block format is supplied from the format converting circuit 17 into the encoder 18 so as to be encoded. A detailed encoding operation will be discussed later with reference to FIG. 17.

The signal encoded by the encoder 18 is outputted to the transmission path as a bit stream which will then be recorded on, for example, the recording medium 3.

The data reproduced from the recording medium 3 is supplied to the decoder 31 of the decoding apparatus 2 so as to be decoded. A detailed structure of the decoder 31 will be explained with reference to FIG. 20.

The data decoded by the decoder 31 is entered into the format converting circuit 32, so that the block format is transformed into the frame format. Then, the luminance signal in the frame format is supplied to a luminance signal frame memory 33 so as to be stored therein, and the color difference signal is supplied to a color difference signal frame memory 35 in order to be stored therein. Both of the luminance signal and the color difference signal, which are read out from the luminance signal frame memory 34 and the color difference signal frame memory 35 are furnished to either a post-staged filter, or a post filter 39 so as to be filtered. Thereafter, the filtered signals are D/A-converted by D/A converters 36 and 37 into analog signals. The analog signals are supplied to a postprocessing circuit 38 in order to be combined with each other. The output picture (image) signal is supplied from an output terminal 30 to a display such as a CRT (not shown) for display operation.

This post filter 39 performs a process to improve an image quality, namely is employed so as to mitigate image deterioration caused by coding the image. In general, as this post filter 39, such a filter is utilized which removes, for instance, block distortion, noise produced near a sharp edge, or the quantizing noise. As explained with reference to FIG. 8 and FIG. 9, the two-dimensional low-pass filter with 3×3 pixels is utilized. In this embodiment, the image signal processing apparatus shown in FIG. 6 is employed.

In other words, the luminance signal read from the luminance signal frame memory 34, and the color difference signal read from the color difference signal frame memory 35 are entered into the input terminal 101 of FIG. 6. The apparatus of FIG. 6 processes at least one of these luminance signal and color difference signal, or both of these signals in a parallel manner, or a time-divisional manner. Then, this apparatus derives the processed signal from the output terminal 110 and supplies the derived signal to the D/A converters 36 and 37.

Figure 17:
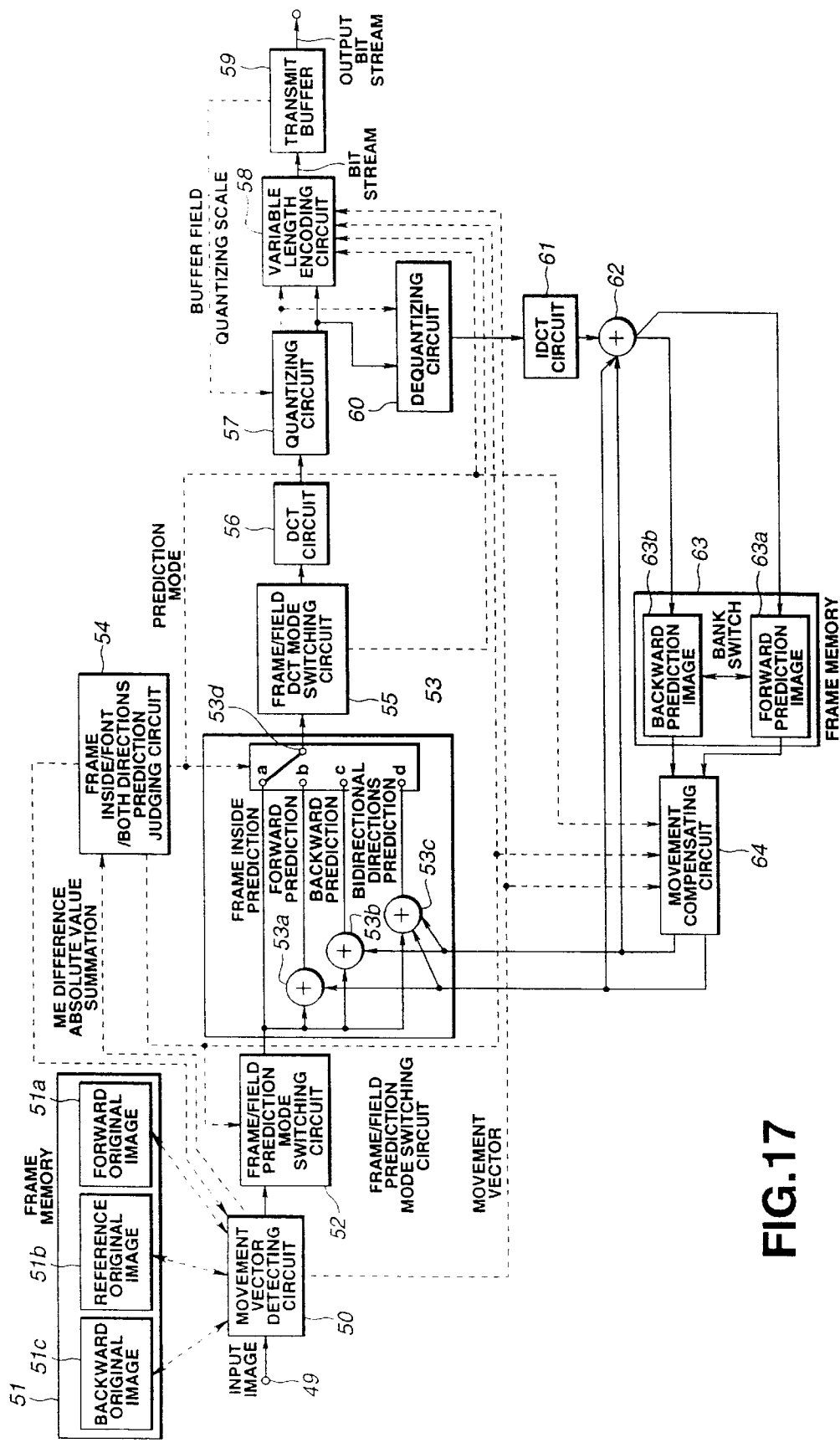
FIG. 17 is a schematic block diagram for representing a structural example of an encoder 18 shown in FIG. 15.

Referring now to FIG. 17, an arrangement of the encoder 18 will be described.

The image data which has been supplied via the input terminal 49 and should be encoded is entered into a movement vector detecting circuit 50 in unit of macroblock. The movement vector detecting circuit 50 processes the image data of the respective frames as an I picture, a P picture, or a B picture in accordance with a preset sequence. A decision how to process the image data of each frame as the I picture, P picture, or B picture is previously made (for example, a shown in FIG. 13, a group of picture constituted by the frame F1 to the frame F17 is processed as I, B, P, B, P, - - - , B, P).

The image data of such a frame to be processed as the I picture (e.g., frame F1) is transferred from the movement vector detecting circuit 50 to a forward original image unit 51a of the frame memory 51 so as to be stored therein. The image data of such a frame to be processed as the B picture (e.g., frame F2) is transferred to an original image unit (reference original image unit) 51b so as to be stored therein. The image data to be processed as the P picture (for example, frame F3) is transferred to a backward original image unit 51c in order to be stored therein.

At the next timing, when the image data of such a frame to be processed as either the B picture (e.g., frame F4), or the P picture (e.g., frame F5) is entered, the image data of the first P picture (namely, frame F3) which has been stored in the backward original image unit 51c is transferred to the forward original image unit 51a. Then, the image data of the next B picture (frame F4) is stored in the original image unit 51b (namely, overwritten), and the image data of the next P picture (frame F5) is stored in the backward original image unit 51c (namely, overwritten). Such an operation is sequentially repeated.

The signals of the respective picture stored in the frame memory 51 are read out from this frame memory 51, and the read signals are processed in a prediction mode switching circuit 52 by way of either a frame prediction mode process, or a field prediction mode process. Moreover, under control of a prediction judging circuit 54, the calculations are performed in a calculation unit 53 in accordance with the intra coding mode, the forward prediction mode, the backward prediction mode, or the bidirectional prediction mode. A decision as to which process operation is carried out is made in unit of macroblock in response to a prediction error signal (namely; a difference between a reference image to be processed and a predicted image thereof). As a consequence, the movement vector detesting circuit 50 produces an absolute value summation (otherwise, squared summation) of the prediction error signals employed in this judgement, and an evaluated value of the intra coding mode corresponding to the prediction error signal in unit of macroblock.

Now, the frame prediction mode and the field prediction mode in the prediction mode switching circuit 52 will be explained.

When the frame prediction mode is set, the prediction mode switching circuit 52 directly outputs four luminance blocks Y[1] to Y[4] supplied from the movement vector detecting circuit 50 to a post-staged calculation unit 53. That is, in this case, as represented in FIG. 18, the data of the lines in the odd-numbered field, and the data of the lines in the even-numbered field are mixed with each other in the respective luminance blocks. It should be noted that a solid line in each of macroblocks of FIG. 18A and FIG. 18B indicates the data of the lines in the odd-numbered field (line of a first field), and a broken line thereof shows the data of the lines in the even-numbered field (line of a second field). Symbols "a" and "b" of FIG. 18A and FIG. 18B show units of movement compensation. In this frame prediction mode, prediction is carried out by using the four luminance blocks (macroblocks) as one unit, and one movement vector corresponds to the four luminance blocks.

To the contrary, when the field prediction mode is set, the prediction mode switching circuit 52 outputs such a signal inputted from the movement vector detecting circuit 50 having the structure shown in FIG. 18A to the calculation unit 53 in such a manner that, as indicated in FIG. 18B, the luminance blocks Y[1] and Y[2] among the four luminance blocks are arranged only by the data of the lines in the odd-numbered field, whereas the remaining two luminance blocks Y[3] and Y[4] are arranged by the data of the lines in the even-numbered field. In this case, one movement vector corresponds to the two luminance blocks Y[1] and Y[2], whereas another movement vector corresponds to the remaining two luminance blocks Y[3] and Y[4].

The color difference signal is supplied to the calculation unit 53 in the case of the frame prediction mode, as shown in FIG. 18, under such a condition that the data of the lines in the odd-numbered field and the data of the lines in the even-numbered field are mixed with each other. In the case of the field prediction mode, as represented in FIG. 18B, the upper half portions (4 lines) of the respective color difference blocks Cb and Cr and the color difference signals in the odd-numbered field corresponding to the luminance blocks Y[1] and Y[2], and the lower half portions thereof (4 lines) are the color difference signals in the even-numbered fields corresponding to the luminance blocks Y[3] and Y[4].

The movement vector detecting circuit 50 produces the evaluation value in the intra coding mode, and the absolute value summation of the respective prediction errors in unit of macroblock. These values are used in the prediction judging circuit 54 to determine that any one of the intra coding mode, the forward prediction mode, the backward prediction mode, and the bidirectional prediction mode is employed to perform the prediction operation with respect to the respective macroblock, and also to determine that either the frame prediction mode, or the field prediction is used to execute the process operation.

In other words, as the evaluation value of the intra coding mode, a calculation is made of an absolute value summation "$\Sigma|Aij-(\text{average value of Aif})|$" of differences between the signal Aij of the macroblock of the reference image which will be coded, and an average value thereof. As an absolute value summation of the forward prediction errors, another calculation is made of a summation $\Sigma|Aij-Bij|$ of an absolute value $|Aij-Bij|$ about a difference (Aij-Bij) between the signal Aij of the macroblock of the reference image and the signal Bij of the macroblock of the prediction image. Similar to the above-explained forward prediction case, as an absolute summation of the prediction errors for the backward prediction and the bidirectional prediction, these absolute value summations are calculated with regard to the frame prediction mode and the field prediction mode (the relevant prediction image is changed into the different prediction image from that of the forward prediction).

These absolute value summations are supplied to the prediction judging circuit 54. The prediction judging circuit 54 selects the smallest ne from the absolute value summations of the prediction errors of the forward prediction, backward prediction, and bidirectional prediction in each of the frame prediction mode and the field prediction mode, as an absolute value summation of prediction errors in the inter prediction. Furthermore, the prediction judging circuit 54 compares this absolute value summation of the prediction errors in this inter prediction with the evaluation value of the intra coding mode to thereby selects a smaller absolute value summation. Then, the mode corresponding to this selected value is selected as the prediction mode and the frame/field prediction mode. That is, when the evaluation value of the intra coding mode becomes smaller, the intra coding mode is set. When the absolute value summation of the prediction errors of the inter prediction becomes smaller, such a mode whose corresponding absolute value summation is the smallest among the forward prediction, the backward prediction, and the bidirectional prediction is set as the prediction mode, and the frame/field prediction mode.

As previously explained, the prediction mode switching circuit 52 supplies the signal of the macroblock of the reference image to the calculation unit 53 with such an arrangement as shown in FIG. 18 corresponding to the mode selected by the prediction judging circuit 54 among the frame or field prediction mode. The movement vector detecting circuit 50 outputs the movement vector between the prediction image and the reference image, which corresponds to the prediction mode selected by the prediction judging circuit 54, and supplies the movement vector to a variable length coding circuit 58 and a movement compensating circuit 64 (will be discussed later). As this movement vector, a selection is made of such a movement vector in which the absolute value summation of the corresponding prediction error becomes minimum.

The prediction judging circuit 54 sets the intra coding mode (namely, mode with no movement compensation) is set as the prediction mode when the image data of the I picture is read out from the forward original image unit 51a by the movement vector detecting circuit 50, and changes the switch 53d of the calculation unit 53 to the contact "a". As a result, the image data of the I picture is inputted to a DCT mode switching circuit 55.

Figures 19A, 19B:
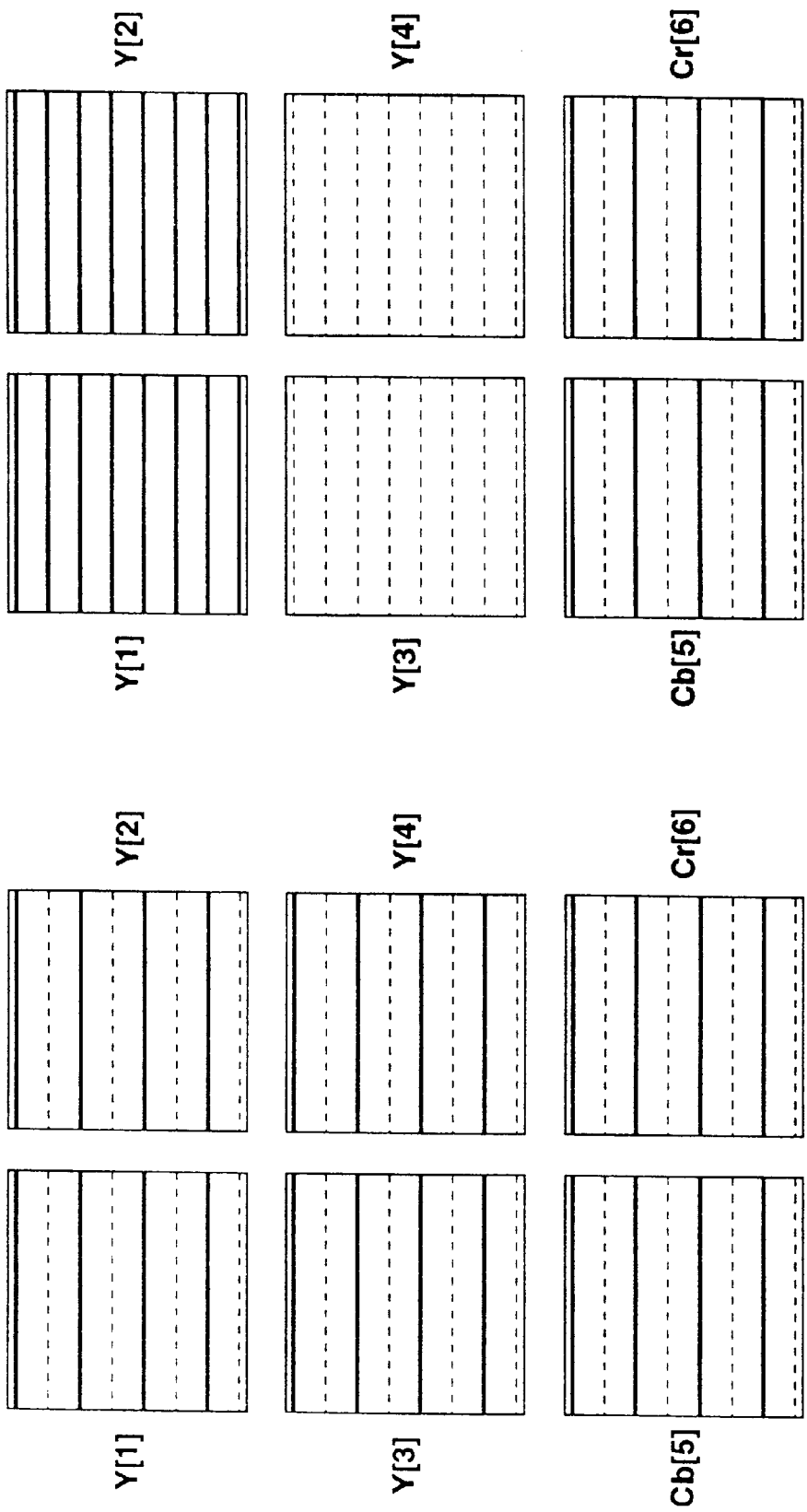
FIG. 19A and FIG. 19B are diagrams for explaining operation of a DCT mode switching circuit 55 of FIG. 17.

This DCT mode switching circuit 55 outputs the data of the four luminance blocks to the DCT circuit 56, as shown in FIG. 19A, or FIG. 14B, under either a condition that the lines of the odd-numbered field and the lines of the even-numbered field are mixed with each other, or a separated condition (field DCT mode).

In other words, the DCT mode switching circuit 55 compares the coding efficiency achieved when the data is DCT-processed by mixing the data of the odd-numbered fields with the data of the even-numbered fields with the coding efficiency achieved when the data is DCT-processed under separate condition, thereby selecting the mode with the better coding efficiency.

For example, as indicated in FIG. 19A, while the inputted signal is so arranged that the lines of the odd-numbered field and the lines of the even-numbered field are-mixed, a calculation is done to obtain a difference between the signals of the lines in the add-numbered field and the signals of the lines in the even-numbered field located adjacent to those of the odd-numbered field along the vertical direction. Furthermore, a summation of the absolute values (or squared summation) is calculated. Also, as indicated in FIG. 19B, while the inputted signal is so arranged that the lines of the odd-numbered field and the lines of the even-numbered field are separated, a calculation is done to obtain a difference between the signals of the mutual lines in the odd-numbered field and another difference between the signals of the mutual lines in the even-numbered field located adjacent to each other along-the vertical direction. Furthermore, a summation of the absolute values (or squared summation) is calculated. In addition, both of these absolute value summations are compared with each other, and the DCT mode corresponding to the smaller value is set. In other words, when the former value becomes smaller, the frame DCT mode is set, whereas when the latter value becomes smaller, the field DCT mode is set.

Then, the data having the structure corresponding to the selected DCT mode is outputted to the DCT circuit 56, and further the DCT flag indicative of the selected DCT mode is outputted to the variable length coding circuit 58.

As apparent from the comparison between the frame/field prediction mode (see FIG. 18A and FIG. 18B) in the prediction mode switching circuit 52 and the DCT mode (see FIG. 19A and FIG. 19B) in this DCT mode switching circuit 55, the data structures in both of the modes re substantially identical to each other with respect to the luminance blocks.

When the frame prediction mode (namely, mode in which odd-numbered lines and even-numbered lines are mixed) is selected in the prediction mode switching circuit 52, there are higher possibilities that the frame DCT mode (namely, mode in which odd-numbered lines and even-numbered lines are mixed) is selected also in the DCT mode switching circuit 55. Similarly, when the field prediction mode (namely, mode in which data in odd-numbered lines are separated from data in even-numbered lines) is selected in the prediction mode switching circuit 52, there are higher possibilities that the field DCT mode (namely, mode in which data in odd-numbered field are separated from data in even-numbered field) is selected in the DCT mode switching circuit 55.

However, the above-described conditions are not always established, but the mode is selected in such a manner that the absolute value summation of the prediction errors becomes small in the prediction mode switching circuit 52, whereas the mode is determined in such a way that the coding efficiency becomes high in the DCT mode switching circuit 55.

The image data on the I picture outputted from the DCT mode switching circuit 55 is inputted into the DCT circuit 56 to be DCT-processed (discrete cosine transform), thereby being transformed into the DCT coefficient. This DCT coefficient is inputted into the quantizing circuit 57, so as to be quantized by the quantizing step corresponding to the data storage amount of the transmit buffer 59 (buffer storage amount). Thereafter, the quantized DCT coefficient is entered into the variable length coding circuit 58.

The variable length coding circuit 58 converts the image data (data on I picture in this case) supplied from the quantizing circuit 57 in correspondence with the quantizing step (scale) supplied from the quantizing circuit 57 into such a variable length code as the Huffman code, and then outputs the variable length code to the transmit buffer 59.

Also, to the variable length coding circuit 58, the quantizing step (scale) is supplied from the quantizing circuit 57; the prediction mode (namely, mode indicating that any one of intra coding mode, forward prediction mode, backward prediction mode, and bidirectional prediction mode is set) is inputted from the prediction judging circuit 54; the movement vector is entered from the movement vector detecting circuit 50; and the prediction flag (namely, flag indicating that any one of frame prediction mode and field prediction mode) is inputted from the prediction judging circuit 54; and also the DCT flag (namely, flag indicating that any one of flame DCT mode and field DCT mode is set) outputted from the DCT mode switching circuit 55 is entered. These parameters are similarly converted into variable length codes.

The transmit buffer 59 temporarily stores the inputted data, and supplies the data corresponding to the data stored amount thereof to the quantizing circuit 57.

In the case that the data remaining amount of the transmit buffer 59 is increased up to the allowable upper limit value, the transmit buffer 59 lowers the data amount of the quantizing data by increasing the quantizing scale of the quantizing circuit 57 in response to the quantizing control signal. Conversely, when the data remaining amount is reduced up to he allowable lower limit value, the transmit buffer 59 increases the data amount of the quantizing data by decreasing the quantizing scale of the quantizing circuit 58 in response to the quantizing control signal. Thus, overflows or underflows of the transmit buffer 59 can be avoided.

Then, the data stored in the transmit buffer 59 is read out at a preselected timing, and then outputted via the output terminal 69 to the transmission path, thereby being recorded on, for example, the recording medium 3.

On the other hand, the data of the I picture outputted from the quantizing circuit 57 is inputted into a dequantizing circuit 60 so as to be dequantized in accordance with the quantizing step supplied from the quantizing circuit 57. The output from the dequantizing circuit 60 is inputted into an IDCT (inverse DCT) circuit 61 in order to be inverse-DCT-processed. Thereafter, the resulting signal is supplied via a calculator 62 to the forward prediction image unit 63a of the frame memory 63 so as to be stored.

When the image data of the respective frames sequentially entered into the movement vector detecting circuit 50 are processed as the pictures of I, B, P, B, P, B - - - (as explained before) by this movement vector detecting circuit 50, the image data of the firstly inputted frame is processed as the I picture. Thereafter, the image data of the thirdly inputted frame is processed as the P picture before the image data of the secondly entered frame is processed as the I picture. The reason is such that as the B picture owns a certain possibility with the backward prediction and the bidirectional prediction, if the P picture as the backward prediction image is not prepared in advance, then this Z picture cannot be decoded.

Under such a circumstance, the movement vector detecting circuit 50 commences the process operation of the image data on the P picture stored in the backward original image unit 51c subsequent to the process operation of the I picture.

Then, similar to the above-explained case, the absolute value summation of the frame differences (prediction error differences), and the evaluate value of the intra coding mode in unit of macroblock are supplied from the movement vector detecting circuit 50 to the prediction judging circuit 54. In response to the evaluation value of the intra coding mode for this P picture in unit of macroblock and also the absolute value of the prediction errors, the prediction judging circuit 54 sets any one of the frame prediction mode, and any one of the intra coding mode and the forward prediction mode.

When the intra coding mode is set, the calculation unit 53 changes the switch 53d to the contact "a", as explained above. As a result, similar to the data on the I picture, this data is transferred to the transmission path via the DCT mode switching circuit 55, the DCT circuit 56, the quantizing circuit 57, the variable length coding circuit 58, and the transmit buffer 59. This data is furnished via the dequantizing circuit 60, the EDCT circuit 61, and the calculator 62 to the backward prediction image unit 63b of the frame memory 63 so as to be stored therein.

On the other hand, when the forward prediction mode is selected, the switch 53b is changed into the contact "b", and also the image data (image data of I picture in this case) stored in the forward prediction image unit 63a of the frame memory 63 is read out. Then, the movement is compensated by the movement compensating circuit 64 in response to the movement vector outputted from the movement vector detecting circuit 50. In other words, when the prediction judging circuit 54 instructs to set the forward prediction mode, the movement compensating circuit 64 shifts the read address of the forward-prediction image unit 63a only by such a shift value corresponding to the movement vector from a position corresponding to the position of the macroblock presently outputted by the movement detecting circuit 50, thereby reading out the data to produce the prediction image data.

The prediction image data outputted from the movement compensating circuit 64 is supplied to the calculator 53a. The calculator 53a subtracts the prediction image data corresponding to the macroblock of the reference image data, which is supplied from the movement compensating circuit 64, from the data on this reference image in the macroblock supplied from the prediction mode switching circuit 52. Then, this calculator 53a outputs a difference thereof (prediction error). This difference data is transmitted via the DCT mode switching circuit 55, the DCT circuit 56, the quantizing circuit 57, the variable length coding circuit 58, and the transmit buffer 59 to the transmission path. This difference data is locally decoded by the dequantizing circuit 60 and the IDCT circuit 61 to thereby be entered into the calculator 62.

The data identical to the prediction image data supplied to the calculator 53a is furnished to this calculator 62. The calculator 62 adds the prediction image data outputted from the movement compensating circuit 64 to the difference data outputted by the IDCT circuit 61. As a result, the image data of the original (decoded) P picture is obtained. This image data of the P picture is supplied to the backward prediction image unit 63b of the frame memory 63, so as to be stored therein. It should be understood that since the data structure of the difference data outputted by the IDCT circuit must be actually identical to the data structure of the prediction image data, which are supplied to the calculator 62, such a circuit is required which rearranges the data so as to accept such a case that the frame/field prediction mode and the frame/field DCT modes are different. However, for the sake of simplicity, this circuit is omitted.

As explained above, the movement vector detecting circuit 50 executes-the process operation of the B picture after the image data of the I picture and the P picture have been stored into the forward prediction image unit 63a and the backward prediction image unit 63b, respectively. In correspondence with the evaluation value of the intra coding mode in unit of macroblock, and also the dimension of the absolute value summation between the frame differences, the prediction judging circuit 54 sets the frame/field prediction mode, and also sets the prediction mode to any one of the intra coding mode, the forward prediction mode, the backward prediction mode, and the bidirectional prediction mode.

As previously described, when either the intra coding mode, or the forward prediction mode is selected, the switch 53d is switched to either the contact "a" or the contact "b". At this time, a similar process operation is carried out as in the P picture, and the data is transmitted.

To the contrary, when either the backward prediction mode or the bidirectional prediction mode is set, the switch 53d is changed into the contact "c" of the contact "d".

In the backward prediction mode where the switch 53d is switched to the contact "c", the image data (image data on I picture in this case) stored in the backward prediction image unit 63b of the frame memory 63 is read out. Then, the movement is compensated by the movement compensating circuit 64 in response to the movement vector outputted from the movement vector detecting circuit 50. In other words, when the prediction judging circuit 54 instructs to set the backward prediction mode, the movement compensating circuit 64 shifts the read address of the backward prediction image unit 63b only by such a shift value corresponding to the movement vector from a position corresponding to the position of the macroblock presently outputted by the movement detecting circuit 50, thereby reading out the data to produce the prediction image data.

The prediction image data outputted from the movement compensating circuit 64 is supplied to the calculator 53b. The calculator 53b subtracts the prediction image data which is supplied from the movement compensating circuit 64, from the data on this reference image in the macroblock supplied from the prediction mode switching circuit 52. Then, this calculator 53b outputs a difference thereof (prediction error). This difference data is transmitted via the DCT mode switching circuit 55, the DCT circuit 56, the quantizing circuit 57, the variable length coding circuit 58, and the transmit buffer 59 to the transmission path.

In the bidirectional prediction mode where the switch 53d is switched to the contact "d", both of the image data (I picture image data in this case) stored into the forward prediction image unit 63a and the image data (P picture image data in this case) stored into the backward prediction image unit 63b are read out. The movements of these read data are compensated by the movement compensating circuit 64 n accordance with the movement vector outputted from the movement vector detecting circuit 50. In other words, when the prediction judging circuit 54 instructs to set the bidirectional prediction mode, the movement compensating circuit 64 shifts the read addresses of the forward prediction image unit 63a and the backward prediction image unit 63b by such a value corresponding to the movement vector from the position corresponding to the position of the macroblock presently outputted by the movement vector detecting circuit 50, thereby reading out the data to produce the prediction image data. This movement vector becomes two vectors for the forward prediction image and the backward prediction image in the frame prediction mode, and becomes 4 vectors, namely two vectors for the forward prediction image, and two vectors for the backward prediction image in the field prediction mode.

The prediction image data outputted from the movement compensating circuit 64 is supplied to the calculator 53c. The calculator 53c subtracts the average value of the prediction image data supplied from the movement compensating circuit 64 from the data of the reference image supplied from the movement vector detecting circuit 50 in the macroblock, and outputs this difference. The difference data is transmitted via the DCT mode switching circuit 55, the DCT circuit 56, the quantizing circuit 57, the variable length coding circuit 58, and the transmit buffer 59 to the transmission path.

Since the B picture image is not used as the prediction image for other image, this B picture image is not stored in the frame memory 6.

In the frame memory 63, the forward prediction image unit 63a and the backward prediction image unit 63b are switched, if necessary. The image data stored in either one image unit 63a, or the other image unit 63b with respect to a preselected reference image, may be switched as the forward prediction image, or the backward prediction image to be outputted.

Although the previous description has been made about the luminance blocks, this processing operation is similarly applied to the color difference blocks in unit of macroblocks shown in FIG. 18 and FIG. 19, and then the processed data is transmitted. It should be noted that as the movement vector used to process the color difference block, the movement vector of the luminance block corresponding thereto is subdivided into ½ along the vertical direction and the horizontal direction.

Figure 20:
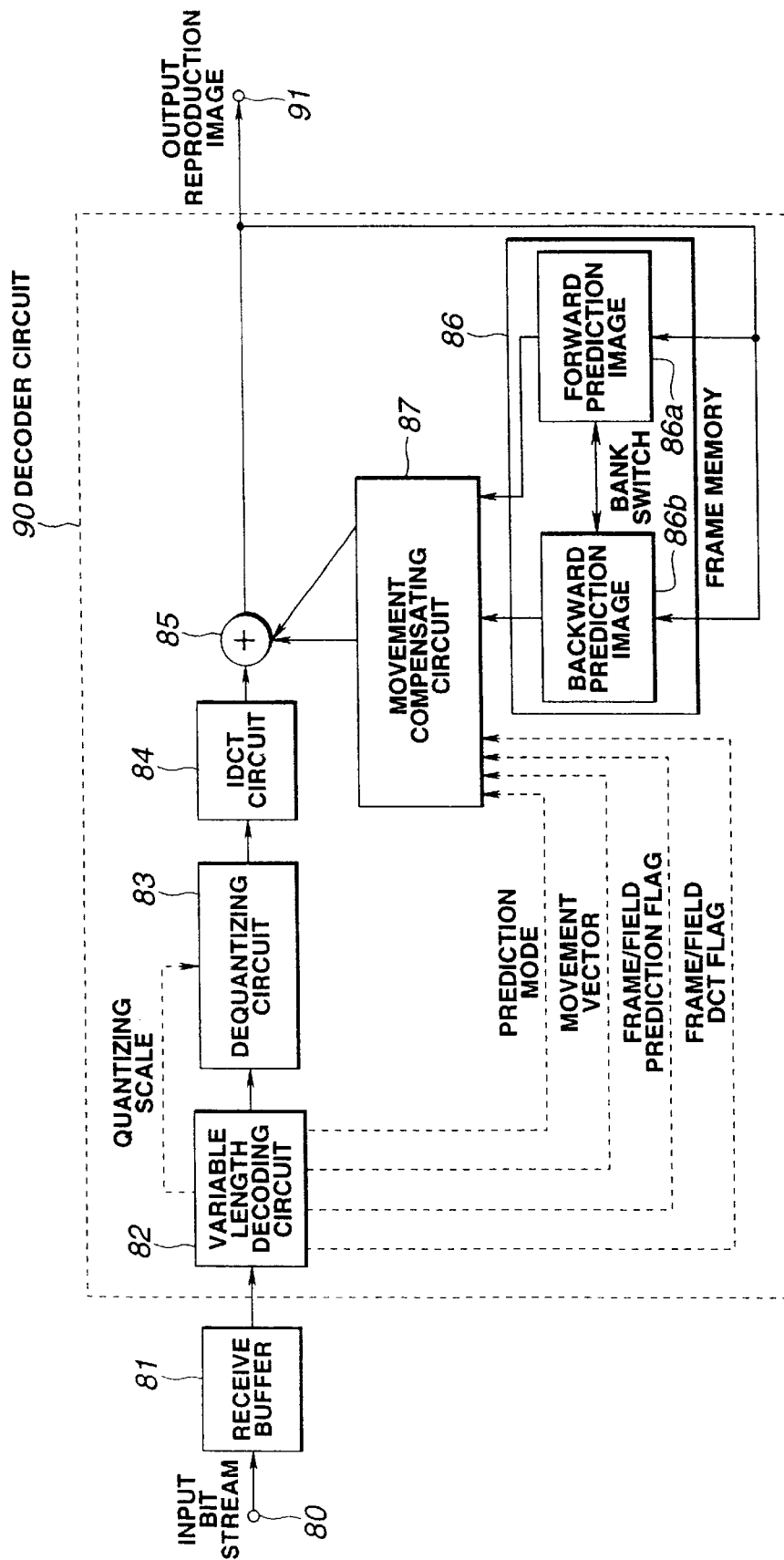
FIG. 20 is a schematic block diagram for showing a structure example of a decoder 31 shown in FIG. 15.

Next, FIG. 20 schematically shows a block diagram of an arrangement of the decoder 31 indicated in FIG. 15. The decoded image data transmitted via the transmission path (recording medium 3) is received by a receiver circuit (not shown), is reproduced in the reproducing apparatus, and is temporarily stored into a receiver buffer 81 via an input terminal 80. Thereafter, this image data is supplied to a variable length decoding circuit 82 of a decoder circuit 90. The variable length decoding circuit 82 variable-length-decodes the data supplied from the receiver buffer 81, outputs a movement vector, a prediction mode, a prediction flag, and a DCT flag to a movement compensating circuit 87. Also, the variable length decoding circuit 82 outputs a quantizing step to a dequantizing circuit 83, and also the decoded image data to the dequantizing circuit 83.

The dequantizing circuit 83 dequantizes the image data supplied from the variable length decoding circuit 82 in accordance with the quantizing step supplied from the variable length decoding circuit 82, to thereby supply the resultant data to an IDCT circuit 84. The data (DCT coefficient) outputted from the dequantizing circuit 83 is inverse-DCT processed in the IDCT circuit 84 to be supplied to a calculator 85.

In the case that the image data supplied from the IDCT circuit 84 is the data of the I picture, this data is outputted from the calculator 85, and also is supplied to a forward prediction image unit 86a of a frame memory 86 to be stored therein in order to produce prediction image data of such image data (image data of P or B picture) which will be entered into the calculator 85 later. This data is outputted to the format converting circuit 32 (see FIG. 15).

When the image data supplied from the EDCT circuit 84 corresponds to the data on the I picture where the preceding image data by 1 frame is the prediction image data; and also to the data in the macroblock encoded in the forward prediction mode, the preceding image data by 1 frame (data on I picture) which has been stored in the forward prediction image unit 86a of the frame memory 86 is read out. This read data is compensated by the movement compensating circuit 87 in correspondence with the movement vector outputted from the variable length decoding circuit 82. Then, in the calculator 85, this compensated data is added to the image data (data of difference) supplied from the IDCT circuit 84. The added data derived from the calculator 85, namely the decoded data of the P picture is stored into a backward prediction image unit 86b of the frame memory 86 in order to produce prediction image data of such image data (image data of B picture, or P picture) which will be inputted into this calculator 85 later.

Even when the data of the P picture is inputted, the data of the macroblock coded in the intra coding mode is not especially processed in the calculator 85, but is directly stored into the backward prediction image unit 86b in a similar manner to the data of the I picture.

Since this P picture corresponds to such an image which should be displayed subsequent to the next B picture, this P picture is not yet outputted to the format converting circuit 32 at this time (as previously explained, P picture inputted after B picture is processed prior to B picture to be transmitted).

When the image data supplied from the IDCT circuit 84 is the data of the I picture, in response to the prediction mode supplied from the variable length decoding circuit 82, the image data of the I picture (in case of forward reduction mode) stored in the forward prediction image unit 86a of the frame memory 86 is read out. The image data of the P picture (in case of backward prediction mode) stored in the backward prediction image unit 86b is read out. Otherwise, both of these image data (in case of bidirectional prediction mode) are read out. Then, the movement corresponding to the movement vector outputted from the variable length decoding circuit 82 is compensated in the movement compensating circuit 87, so that a prediction image is produced. It should be understood that when no movement compensation is required (in case of intra coding mode), such a prediction image is not produced.

As a described above, the data movement-compensated by the movement compensating circuit 87 is added with the output from the calculator 85. The addition result is outputted via an output terminal 91 to the format converting circuit 32.

It should also be noted that this addition result corresponds to the data of the B picture, and since this image data is not utilized so as to produce a prediction image of other image, this image data is not stored into the frame memory 86.

After the image of the B picture has been outputted, the image data of the P picture stored in the backward prediction image unit 86b is read out and then is outputted as the reproduction image via the movement compensating circuit 87 and the calculator 85. At this time, neither the movement compensation, nor the addition is carried out.

It should be noted that there are not shown such circuits corresponding to the prediction mode switching circuit 52 and the DCT mode switching circuit 55 employed in the encoder 18 of FIG. 17 in this decoder 13, the process operations executed by these circuits are performed by the movement compensating circuit 87, namely the structure that the signals of the lines in the odd-numbered field are separated from the signals of the lines in the even-numbered field is returned to the original mixing structure, if necessary.

Although the luminance signals have been processed in the above-described embodiment, the color difference signals may be similarly processed. In this case, as the movement vector the movement vector for the luminance signal is subdivided into ½ along the vertical direction and the horizontal direction.

Figure 21:
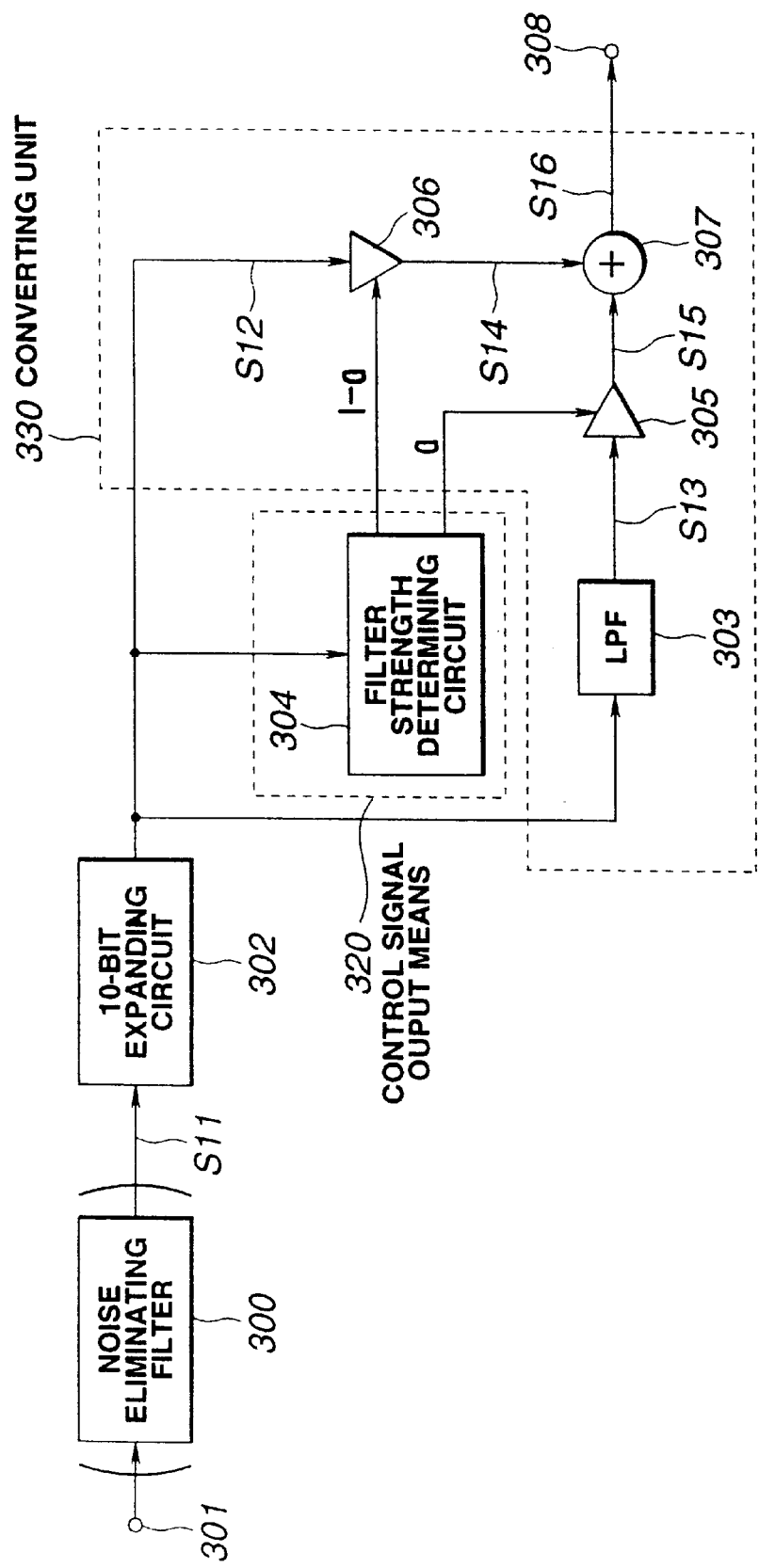
FIG. 21 is a schematic block diagram for representing an image signal processing apparatus according to another embodiment of the present invention.

Referring now to FIG. 21, another embodiment of the present invention will be explained.

It should be noted that a moving picture coding/decoding apparatus of this embodiment shown in FIG. 21 is similar to the above-described apparatus represented in FIG. 6, and thereafter may be apparently applied as the post filter 39 of FIG. 15.

In FIG. 21, when an 8-bit image signal S11 is inputted to an input terminal 301, this image signal is supplied via a noise removing filter 300 (will be discussed later, if necessary) to a 10-bit expanding circuit 302, 2 bits of "0" are added to the LSB of the input 8-bit image signal so as to expand the bit of this image signal, thereby producing a 10-bit output signal S12. This 10-bit image signal S12 is supplied to a control signal output means 320 and a converting unit 330. These signals S11 and S12 are similar to the signals S1 and S2 of the above-described embodiment shown in FIG. 6.

The output signal S12 from the 10-bit expanding circuit 302 is inputted into a low-pass filter 303 and a multiplier 306 employed in the converting unit 330, and into a filter strength determining circuit 304 functioning as the control signal output means 320.

The low-pass filter 303 filters the 10-bit expanded image signal S12 to output a signal S13. This output signal S13 of the low-pass filter 303 is similar to the above-explained signal S3 of FIG. 6, and is entered into the multiplier 305.

In the multiplier 305, an output signal S15 obtained by multiplying the signal S13 by a coefficient "a" is sent to the adder 307, namely $$S15 = S13a,$$

note $0 \leq a \leq 1$.

This coefficient "a" is controlled by the filter strength determining circuit 304.

In the multiplier 306, another output signal S14 obtained by multiplying the output signal S12 from the 10-bit expanding circuit 302 by another coefficient (1−a) is supplied to the adder 307, namely:

$$S=14=S12\times(1-a).$$

This coefficient (1−a) is controlled by the filter strength determining circuit 304.

The adder 307 adds the signal S14 with the signal S15 to obtain an output signal S16 which will then be supplied to an output terminal 308, namely:

$$S16 = S14 + S15 \quad (1)$$
$$= S12 \times (1-a) + S13 \times a.$$

Subsequently, the filter strength determining circuit 304 will now be explained.

In the filter strength determining circuit 304 shown in FIG. 21, the output from the low-pass filter 303 is added with the output from the 10-bit expanding circuit 302 at a preselected ratio, and the added output is derived. This is because the high frequency component of the output signal from the low-pass filter 303 has been lost. Therefore, the original image is added to this filter output at a preselected ratio in order to recover this high frequency component. From the above-described formula (1), when a=0, the original image is outputted. When a=1, the filter output is directly outputted. The coefficient "a" may become arbitrary values from 0 to 1. When this coefficient "a" is approximated to "0", the filter output is close to the original image. When this coefficient "a" is approximated to "1", the filter output is emphasized.

The filter strength determining circuit 304 determines the coefficient "a" contained in the formula (1), namely the ratio of the signal S12 to the signal S13.

The method for determining this multiply coefficient "a" will now be explained.

A great effect achieved by bit-expanding the input image so as to smooth it appears in a flat portion. This is because a visual characteristic of a human is highly sensitive to a flat portion. As a result, the flatness degree of the image signal is measured by the filter strength determining circuit 304, and then the coefficient "a" may be determined based on this flatness degree.

Figure 22:
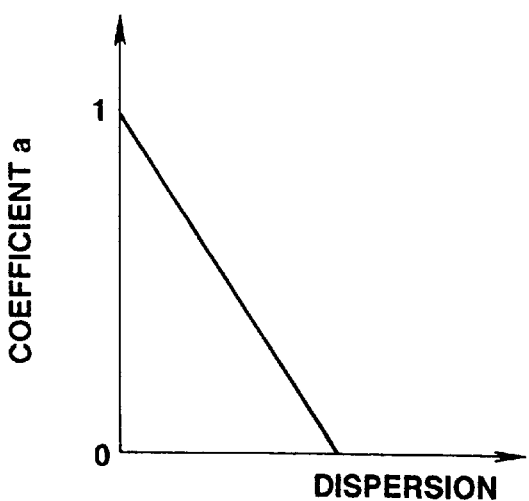
FIG. 22 is a graphic representation for indicating a relationship between a coefficient of a filter strength determining circuit and dispersion of an image signal.

A flatness degree of an image signal implies, for example, dispersion of an image. When the dispersion of the image becomes small, this image becomes flat. In this case, the filter strength determining circuit 304 may be so arranged as to measure dispersion while a certain pixel is recognized as a center. The filter strength determining circuit 304 determines the coefficient "a" as indicated in, for instance, FIG. 22 in accordance with the measured dispersion, and then outputs this coefficient "a" to the multiplier 306 and another coefficient (1−a) to the multiplier 305. The coefficient "a" is determined in unit of pixel, and is properly processed.

Figure 23:
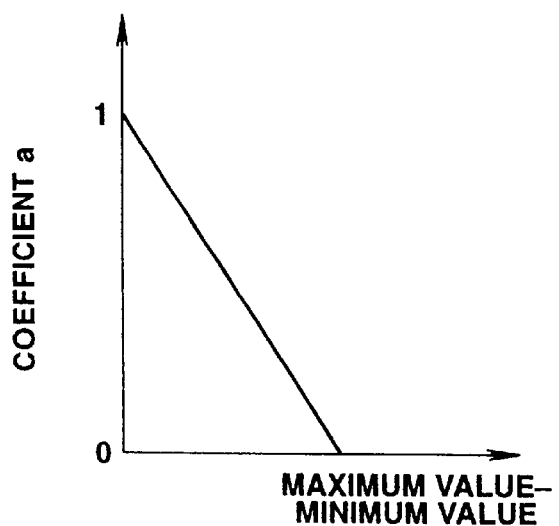
FIG. 23 is a graphic representation for indicating a relationship between a coefficient of a filter strength determining circuit and a dynamic range of an image signal.

As another parameter indicating a flatness degree of an image under measurement in the filter strength determining circuit 304, a dynamic range of this image may be used. A dynamic range of an image implies a difference between a maximum value and a minimum value of an image signal. Since a flat background is a plain surface, a dynamic range thereof is narrow. Since a human and an object own curvatures, dynamic ranges thereof become wide. As a consequence, the smaller the difference between the maximum value and the minimum value of the image signal becomes, the more the image becomes flat. In this case, the filter strength determining circuit 304 may be so arranged as to measure a dynamic range while positioning a certain pixel as a center, namely: dynamic range=maximum value−minimum value. Depending upon the measured dynamic range, the coefficient "a" is determined as illustrated in FIG. 23, and then is outputted.

Figure 24:
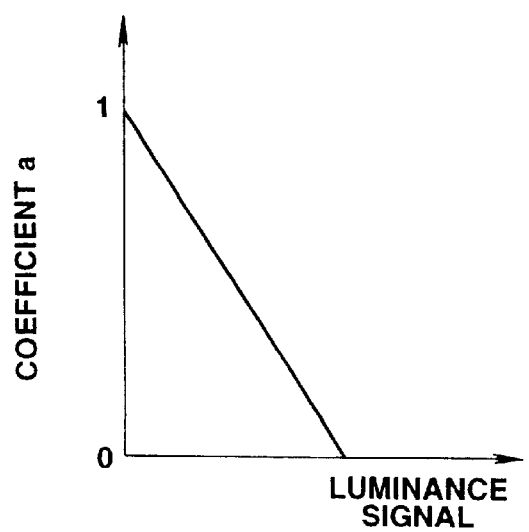
FIG. 24 is a graphic representation for showing a relationship between a coefficient of a filter strength determining circuit and a luminance signal level of an image signal.

As a modification of this filter strength determined circuit 304, the coefficient "a" may be determined in response to a luminance signal level of an image signal. This may introduce a great effect of the 10-bit expansion by such a fact that the darker brightness of a portion, the easier the 1 bit difference can be recognized in the 8-bit image. In this case, the filter strength determining circuit 304 determines the coefficient "a" in response to the luminance signal level, as represented in FIG. 24, and outputs the determined coefficient "a".

Alternatively, a plurality of these coefficient determining methods may be employed at the same time, or other coefficient determining methods may be utilized.

Next, a description will now be made of the noise eliminating filter 300 functioning as the noise eliminating means shown in FIG. 21.

This noise eliminating filter 300 may be used or may not be used. The following description is made in such a case that the noise eliminating filter 300 is inserted/connected to the front stage of the 10-bit expanding circuit 302 equal to the bit expanding means.

This noise eliminating filter 300 eliminates a noise component contained in the image signal, and is realized by, for instance, a low-pass filter. As this low-pass filter, a linear filter or a nonlinear filter may be employed.

FIG. 25A shows an image signal SS1 containing a large number of noises. In FIG. 25B, the output signal of the noise eliminating filter 300 when this image signal SS1 is inputted is indicated as "SS2". When the noise eliminating filter 300 is used, the noises are removed and the image is smoothed, so that there are manu flat portions. As a consequence, there is another problem that a pseudo contour may be produced.

According to the embodiment of the present invention, a step of a 1 bit difference in 8 bits is smoothed at a flat portion of an image signal by making up an intermediate gradation. However, if the noise is contained in this image, then the flat portion cannot be discriminated from the step.

Under such a reason, the noise eliminating filter 300 is inserted/connected to the front stage of the 10-bit expanding circuit 302 functioning as the bit expanding means according to this embodiment, and then the 8-bit-to-10-bit converting process is carried out after performing the noise elimination by the noise eliminating filtering process. As a consequence, the above-described two problems can be solved.

A similar effect may be apparently achieved by inserting/connecting such a noise eliminating filter 300 to the front stage of the 10-bit expanding circuit 102 functioning as the bit expanding means of the embodiment of FIG. 6.

It should be understood that the present invention is not limited to the above-described embodiments, but may be modified, substituted, and changed. For example, the bit conversion from 8 bits to 10 bits may be alternatively substituted by converting n bits into m bits, where symbols "n" and "m" are integers, and have a relationship of n<m. Also, the coding/decoding methods as explained in FIG. 12 and FIG. 20 may be substituted by arbitrary coding/decoding methods.

According to the present invention, the n-bit quantized input image signal is bit-expanded into the m-bit image signal in response to the control signal. Accordingly, the intermediate gradation is produced to mitigate the quantizing noise.

Also, since the input image signal is smoothed by the low-pass filter, and at the same time, such a process operation is carried out in order not to lose the high frequency component of the input image signal, the pseudo contours caused by the capability limit of the image signal does not appear in emphasized manner without deteriorating the resolution.

What is claimed is:

1. An apparatus for processing digital image signals to reduce the effect of quantizing noise in the images represented by the digital image signals, comprising:
   means for converting an n-bit image signal into an m-bit image signal, wherein m and n are integers and m is greater than n;
   means for filtering said m-bit image signal to generate a low frequency m-bit image signal;
   means for estimating the high frequency content of said m-bit image signal without calculating edge-portion intensities for said m-bit image signal;
   means for generating a first multiplier that is proportional to the high frequency content of said m-bit image signal, and a second multiplier that is inversely proportional to the high frequency content of said m-bit image signal, wherein said first and second multipliers do not depend on the relative frequency content of spatially adjacent blocks of said n-bit and m-bit image signals;
   means for amplifying said m-bit image signal by said first multiplier to generate an amplified m-bit image signal;
   means for amplifying said low frequency m-bit image signal by said second multiplier to generate an amplified low frequency m-bit image signal; and
   means for combining said amplified m-bit image signal with said amplified low frequency m-bit image signal to generate said reduced quantizing noise m-bit image signal;
   whereby said means for converting an n-bit image signal into an m-bit image signal has an integral means for reducing noise in said n-bit image signal.

2. The apparatus as set forth in claim 1, wherein said means for estimating is operable to estimate the high frequency content of each portion of said m-bit signal according to at least one of: a dispersion of said portion, a dynamic range of said portion and a luminance level of said portion.

3. The apparatus as set forth in claim 1, further comprising means for eliminating noise from said n-bit signal prior to converting said n-bit signal into said m-bit signal.

4. A method for processing digital image signals to reduce the effect of quantizing noise in the images represented by the digital image signals, comprising the steps of:
   converting an n-bit image signal into an m-bit image signal, wherein m and n are integers and m is greater than n;
   filtering said m-bit image signal to generate a low frequency m-bit image signal;
   estimating the high frequency content of said m-bit image signal without calculating edge-portion intensities for said m-bit image signal;
   generating a first multiplier that is proportional to the high frequency content of said m-bit image signal, and a second multiplier that is inversely proportional to the high frequency content of said m-bit image signal, wherein said first and second multipliers do not depend on the relative frequency content of spatially adjacent blocks of said n-bit and m-bit image signals;
   amplifying said m-bit image signal by said first multiplier to generate an amplified m-bit image signal;
   amplifying said low frequency m-bit image signal by said second multiplier to generate an amplified low frequency m-bit image signal; and
   combining said amplified m-bit image signal with said amplified low frequency m-bit image signal to generate said reduced quantizing noise m-bit image signal;
   whereby said step of converting an n-bit image signal into an m-bit image signal is performed by a means for converting, and said means for converting has an integral means for reducing noise in said n-bit image signal.

5. The method as set forth in claim 4, wherein the high frequency content of each portion of said m-bit signal is estimated according to at least one of: a dispersion of said portion, a dynamic range of said portion and a luminance level of said portion.

6. The method as set forth in claim 4, further comprising the step of eliminating noise from said n-bit signal prior to converting said n-bit signal into said m-bit signal.

* * * * *